(12) United States Patent
Kawano et al.

(10) Patent No.: US 10,475,439 B2
(45) Date of Patent: Nov. 12, 2019

(54) INFORMATION PROCESSING SYSTEM AND INFORMATION PROCESSING METHOD

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/536,299

(22) PCT Filed: Dec. 7, 2015

(86) PCT No.: PCT/JP2015/084293
§ 371 (c)(1),
(2) Date: Jun. 15, 2017

(87) PCT Pub. No.: WO2016/151956
PCT Pub. Date: Sep. 29, 2016

(65) Prior Publication Data
US 2017/0330555 A1   Nov. 16, 2017

(30) Foreign Application Priority Data

Mar. 23, 2015 (JP) ................................ 2015-059567

(51) Int. Cl.
*G01L 15/00* (2006.01)
*G10L 15/01* (2013.01)
(Continued)

(52) U.S. Cl.
CPC .............. *G10L 15/01* (2013.01); *G06F 3/011* (2013.01); *G06F 3/013* (2013.01); *G06F 3/017* (2013.01);
(Continued)

(58) Field of Classification Search
CPC ......... G10L 15/00; G10L 15/04; G10L 15/05; G10L 15/065; G10L 15/183; G10L 15/20; G10L 15/22; G10L 15/222; G10L 15/24
(Continued)

(56) References Cited

U.S. PATENT DOCUMENTS 6,243,683 B1 * 6/2001 Peters ..................... G10L 15/24
434/4
6,804,396 B2 * 10/2004 Higaki ............... G06K 9/00335
382/181
(Continued)

OTHER PUBLICATIONS

Oct. 9, 2018, European Search Report issued for related EP application No. 15886508.9.
(Continued)

*Primary Examiner* — Qi Han
(74) *Attorney, Agent, or Firm* — Paratus Law Group, PLLC

(57) ABSTRACT

There is provided an information processing system enabling a user to provide easily an instruction on whether to continue speech recognition processing on sound information, the information processing system including: a recognition control portion configured to control a speech recognition portion so that the speech recognition portion performs speech recognition processing on sound information input from a sound collection portion. The recognition control portion controls whether to continue the speech recognition processing on the basis of a gesture of a user detected at predetermined timing.

15 Claims, 27 Drawing Sheets

(51) Int. Cl.
  *G06F 3/16*   (2006.01)
  *G06T 7/20*   (2017.01)
  *G10L 15/28*  (2013.01)
  *G06F 3/01*   (2006.01)
  *G06F 3/0488* (2013.01)
  *G06F 3/042*  (2006.01)
  *G10L 15/22*  (2006.01)
  *G06F 3/0481* (2013.01)

(52) U.S. Cl.
  CPC .......... *G06F 3/0425* (2013.01); *G06F 3/0488* (2013.01); *G06F 3/04817* (2013.01); *G06F 3/16* (2013.01); *G06F 3/167* (2013.01); *G06T 7/20* (2013.01); *G10L 15/22* (2013.01); *G10L 15/28* (2013.01)

(58) Field of Classification Search
  USPC .... 704/231, 233, 236, 248, 249, 250, 270.1, 704/275
  See application file for complete search history.

(56) References Cited

U.S. PATENT DOCUMENTS

2002/0105575 A1* 8/2002 Hinde .................... G10L 15/24
                                                    348/14.01
2012/0295708 A1   11/2012 Hernandez-Abrego et al.

OTHER PUBLICATIONS

Jul. 18, 2019, European Communication issued for related EP application No. 15886508.9.

\* cited by examiner

INFORMATION PROCESSING SYSTEM AND INFORMATION PROCESSING METHOD

CROSS REFERENCE TO PRIOR APPLICATION

This application is a National Stage Patent Application of PCT International Patent Application No. PCT/JP2015/084293 (filed on Dec. 7, 2015) under 35 U.S.C. § 371, which claims priority to Japanese Patent Application No. 2015-059567 (filed on Mar. 23, 2015), which are all hereby incorporated by reference in their entirety.

TECHNICAL FIELD

The present disclosure relates to an information processing system and an information processing method.

BACKGROUND ART

In recent years, there has been known a technique for performing speech recognition processing on sound information collected by a microphone to obtain a recognition result of the speech recognition processing. The recognition result of the speech recognition processing is output in a mode that is perceivable by the user. In one example, the speech recognition processing on the sound information collected by the microphone can be started by setting an event in which a start operation is input from the user as a trigger (see, e.g., Patent Literature 1).

CITATION LIST

Patent Literature

Patent Literature 1: JP 2004-094077A

DISCLOSURE OF INVENTION

Technical Problem

In this regard, even when the speech recognition processing on the sound information collected by the microphone is stopped temporarily, it is conceivable that the user may want to continue the speech recognition processing on the sound information. Thus, it is desirable to provide technology that enables the user to provide easily an instruction on whether to continue the speech recognition processing on the sound information.

Solution to Problem

According to the present disclosure, there is provided an information processing system including: a recognition control portion configured to control a speech recognition portion so that the speech recognition portion performs speech recognition processing on sound information input from a sound collection portion. The recognition control portion controls whether to continue the speech recognition processing on the basis of a gesture of a user detected at predetermined timing.

According to the present disclosure, there is provided an information processing method including: controlling a speech recognition portion so that the speech recognition portion performs speech recognition processing on sound information input from a sound collection portion. The controlling includes controlling, by a processor, whether to continue the speech recognition processing on the basis of a gesture of a user detected at predetermined timing.

Advantageous Effects of Invention

According to the present disclosure as described above, there is provided technology that enables the user to provide easily an instruction on whether to continue the speech recognition processing on the sound information. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
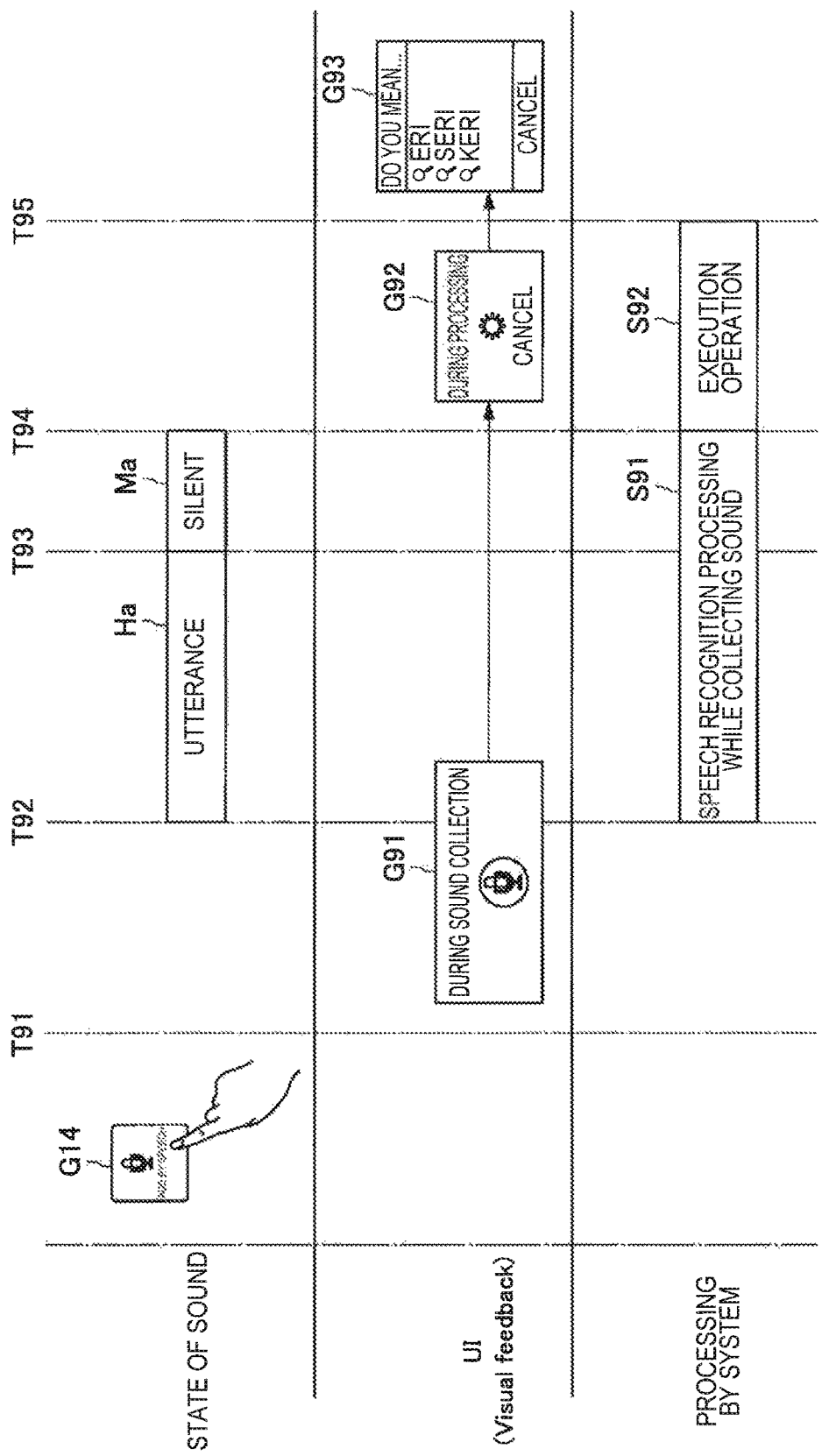
FIG. 1 is a diagram illustrated to describe speech recognition processing in a typical system.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated description of these structural elements is omitted.

Note that, in this description and the drawings, structural elements that have substantially the same function and structure are sometimes distinguished from each other using different numerals after the same reference sign. However, when there is no need in particular to distinguish structural elements that have substantially the same function and structure, the same reference sign alone is attached.

Moreover, the description will be given in the following order.
0. Background
1. Embodiment of present disclosure
1.1. System configuration example
1.2. Functional configuration example
1.3. Function details of information processing system
1.4. Modified example of system configuration
1.5. Display mode of motion object
1.6. Modified example of user's gesture
1.7. Hardware configuration example
2. Conclusion

0. BACKGROUND

The background of an embodiment of the present disclosure is described now with reference to the drawings. FIG. 1 is a diagram illustrated to describe speech recognition processing in a typical system. The terms "speech" (or voice) and "sound" are used herein as different terms. In addition, the term "utterance" indicates a state in which a user is speaking, and the term "silence" indicates a state in which sound information having a volume lower than a threshold is collected.

As illustrated in FIG. 1, there may be a case where a user inputs an operation of selecting a speech recognition start operation object G14 for starting the speech recognition processing. In this case, the typical system (hereinafter also simply referred to as "system") detects such an operation as a trigger for activation of the speech recognition processing and displays a sound collection start screen G91 (time T91). When the sound collection start screen G91 is displayed, the user starts to speak utterance (time T92), and the system collects sound through a microphone and performs the speech recognition processing on the collected sound information (S91).

When an utterance section Ha ends (time T93), a silent state is started. Then, there may be a case of detecting a section Ma (hereinafter also referred to as "silent section") in which the duration during which the volume of the sound information collected through the microphone continuously falls below the reference sound volume reaches a predetermined target time (time T94). In this case, a predetermined execution operation is executed on the basis of a result of the speech recognition processing performed on the sound information collected over the utterance section Ha (S92).

In this regard, the execution operation based on the result of the speech recognition processing is not limited to a particular operation. An example of the execution operation based on the result of the speech recognition processing includes an operation of outputting a search result corresponding to a string as the result of the speech recognition processing, an operation of outputting a string as the result of the speech recognition processing, an operation of outputting a processing result candidate obtained during the speech recognition processing, and an operation of outputting a string for replying to the utterance contents extracted from the string of the result of the speech recognition processing.

In this regard, a technique of extracting the utterance contents from the string as the result of the speech recognition processing is not limited to a particular technique. In one example, the technique of extracting the utterance contents from the string as the result of speech recognition processing may extract the utterance contents by performing natural language processing (e.g., language analysis and semantic analysis) on the string obtained as the result of the speech recognition processing.

During the process of the execution operation, the system displays a screen G92 indicating that the execution operation is in progress. Then, when the execution operation ends (time T95), the system displays a screen G93 showing a result of the execution operation. In the example illustrated in FIG. 1, the screen G93 showing the result of the execution operation includes "eri", "seri", and "keri" as a search result corresponding to the string as the result of the speech recognition processing.

As described above, in the typical system, the detection of the silent section will stop temporarily the speech recognition processing on the sound information collected through the microphone. Thus, in the case where a user thinks contents to be uttered while speaking utterance, the period of time when the user stops speaking to think contents to be uttered will be detected as the silent section. Thus, only up to the middle of the utterance contents intended by the user will be likely to be a target of the speech recognition processing.

Further, the user is likely to forget the utterance contents while speaking utterance, and is likely to do another work not speaking (e.g., it is likely to be fallen into an urgent situation during driving a car). Thus, for this reason, the period of time during which the utterance is stopped will be detected as a silent section, and so only up to the middle of the utterance contents intended by the user will be likely to be a target of the speech recognition processing.

Further, in the case where the speech recognition processing is stopped temporarily and the execution operation based on the result of the speech recognition processing is started, even if the subsequent utterance is started when the speech recognition processing is resumed, the subsequent utterance is likely to fail to be incorporated into the previously started execution operation. In addition, when the user waits for completion of the execution operation to continue the subsequent utterance while viewing the result of the execution operation, the user is likely to forget the subsequent utterance contents and is likely to forget the contents the user is thinking, which leads to loss of opportunity.

Further, although it is conceivable to avoid a silent section from being detected by speaking an unnecessary utterance after the utterance is interrupted, it will be likely to perform the speech recognition processing on the unnecessary utterance. In addition, the speech recognition processing performed on the unnecessary utterance will cause the result of the speech recognition processing to be influenced by the contents to be a target of the speech recognition processing, which are uttered subsequent to the unnecessary utterance.

As described above, in the typical system, when a silent section is detected from sound information collected through a microphone and the speech recognition processing on the sound information is temporarily stopped, it may be difficult to continue the speech recognition processing again. Thus, the present disclosure provides technology that enables the user to provide easily an instruction on whether to continue the speech recognition processing on the sound information collected through the microphone.

The background of the embodiment of the present disclosure is described above.

1. EMBODIMENT OF PRESENT DISCLOSURE

[1.1. System Configuration Example]

Figure 2:
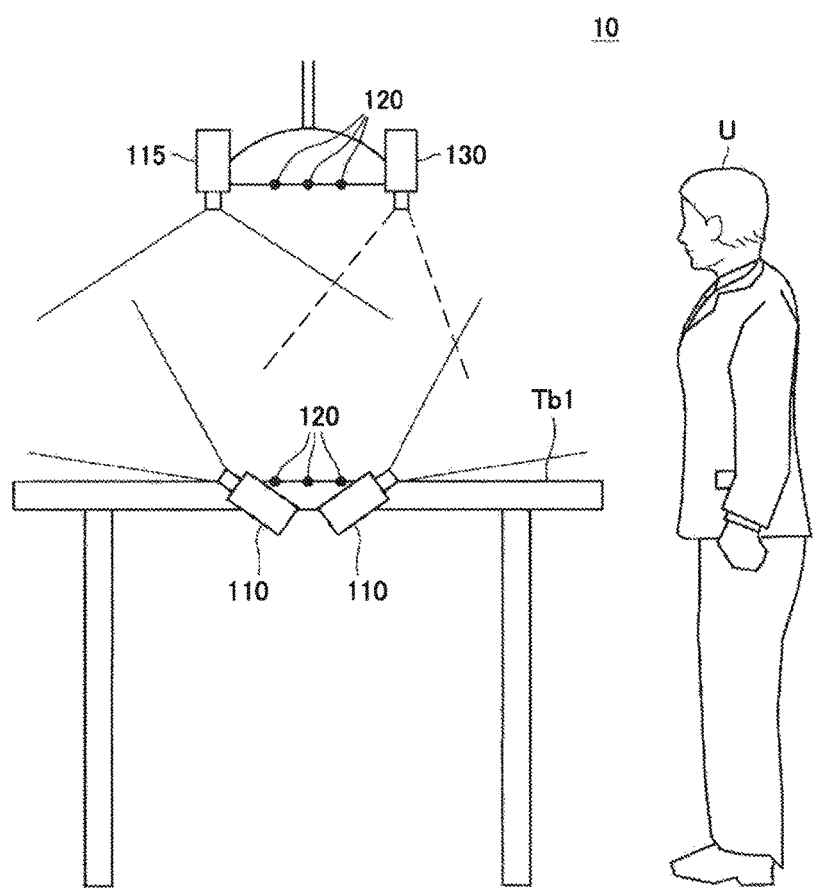
FIG. 2 is a diagram illustrating a configuration example of an information processing system according to an embodiment of the present disclosure.

Subsequently, a configuration example of an information processing system 10 according to an embodiment of the present disclosure is described with reference to the drawings. FIG. 2 is a diagram illustrating a configuration example of the information processing system 10 according to an embodiment of the present disclosure. As illustrated in FIG. 2, the information processing system 10 according to the embodiment of the present disclosure is configured to include an image input portion 110, an operation input portion 115, a sound collection portion 120, and an output portion 130. The information processing system 10 is capable of performing speech recognition processing on the speech uttered by a user U (hereinafter also simply referred to as "user").

The image input portion 110 has a function of inputting an image. In the example illustrated in FIG. 2, the image input portion 110 includes two cameras embedded in a table Tbl. However, the number of cameras included in the image input portion 110 is not limited to the particular number as long as it is one or more. In such a case, the position where each of one or more cameras included in the image input portion 110 is provided is also not limited to a particular position. In addition, one or more cameras may include a monocular camera or a stereo camera.

The operation input portion 115 has a function of inputting an operation of the user U. In the example illustrated in FIG. 2, the operation input portion 115 includes one camera suspended from the ceiling above the table Tbl. However, the position at which the camera included in the operation input portion 115 is provided is not limited to a particular position. In addition, the camera may include a monocular camera or a stereo camera. In addition, the operation input portion 115 may be anything other than a camera as long as it has a function of inputting the operation of the user U, and may be, for example, a touch panel or a hardware button.

The output portion 130 has a function of displaying a screen on the table Tbl. In the example illustrated in FIG. 2, the output portion 130 is suspended from the ceiling above the table Tbl. However, the position at which the output portion 130 is provided is not limited to a particular position. In addition, the output portion 130 may typically be a projector capable of projecting a screen onto the top surface of the table Tbl, but it may be other types of display as long as it has a function of displaying a screen.

Moreover, although the case where the top surface of the table Tbl is the display surface of the screen is mainly described herein, the display surface of the screen may be other than the top surface of the table Tbl. An example of the display surface of the screen may include a wall, a building, a floor surface, a ground surface, or a ceiling. Alternatively, the display surface of the screen may be a non-planar surface like curtain folds, or may be a surface at another position. In addition, when the output portion 130 has its own display surface, the display surface of the screen may be the display surface of the output portion 130.

The sound collection portion 120 has a function of collecting sound. In the example illustrated in FIG. 2, the sound collection portion 120 includes six microphones in total, that is, three microphones above the table Tbl and three microphones on the top of the table Tbl. However, the number of microphones included in the sound collection portion 120 is not limited to a particular number as long as it is one or more. In such a case, the position where each of one or more microphones included in the sound collection portion 120 is provided is also not limited to a particular position.

However, the sound collection portion 120 including a plurality of microphones allows the arrival direction of sound to be estimated on the basis of sound information collected through each of the plurality of microphones. In addition, when the sound collection portion 120 includes a directivity microphone, the arrival direction of sound can be estimated on the basis of the sound information collected through the directivity microphone.

The above description is given as to the configuration example of the information processing system 10 according to an embodiment of the present disclosure.

[1.2. Functional Configuration Example]

Figure 3:
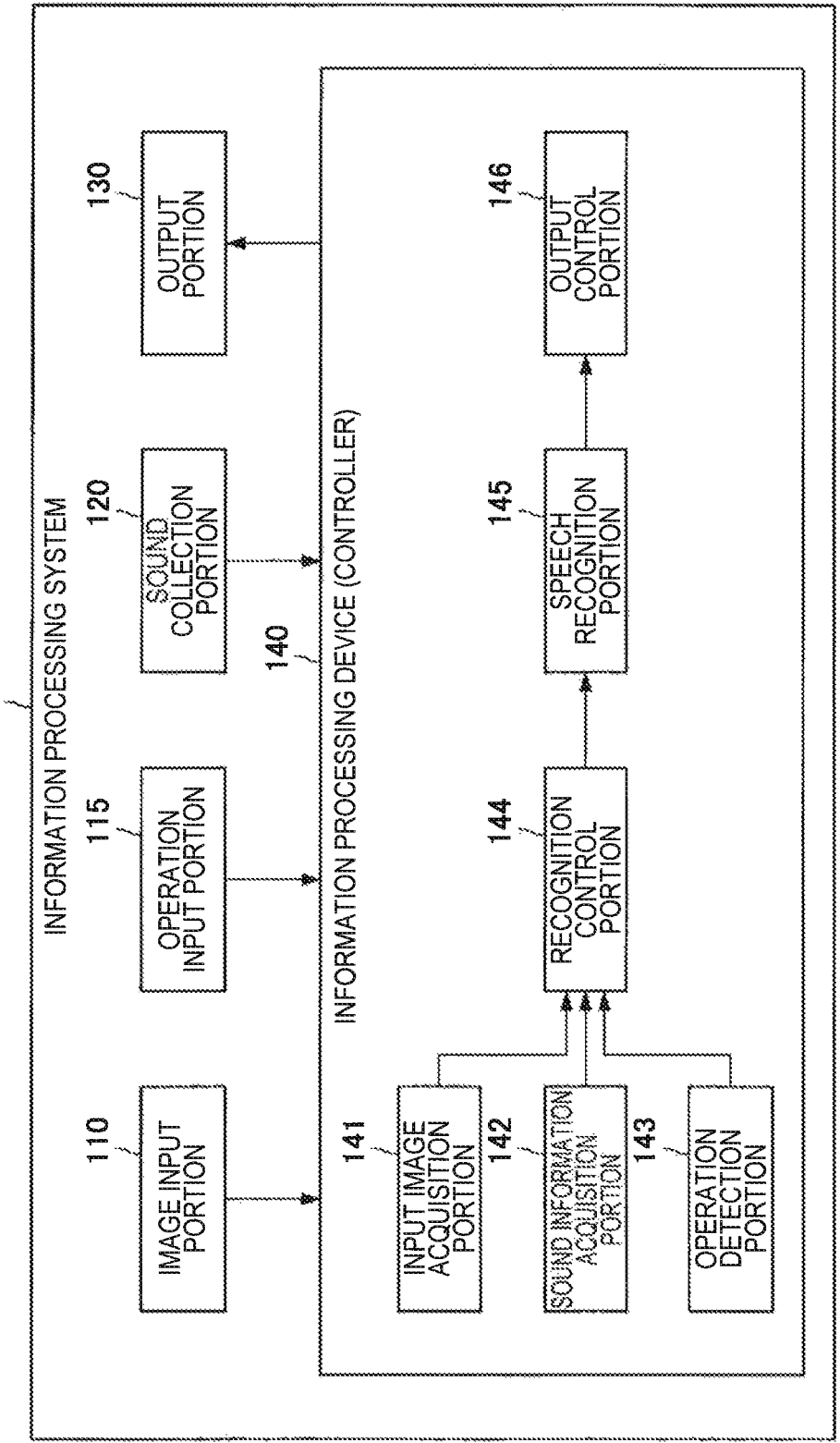
FIG. 3 is a block diagram illustrating a functional configuration example of the information processing system according to the embodiment of the present disclosure.

Subsequently, a functional configuration example of the information processing system 10 according to an embodiment of the present disclosure is described. FIG. 3 is a block diagram illustrating a functional configuration example of the information processing system 10 according to an embodiment of the present disclosure. As illustrated in FIG. 3, the information processing system 10 according to an embodiment of the present disclosure is configured to include the image input portion 110, the operation input portion 115, the sound collection portion 120, the output portion 130, and an information processing device 140 (hereinafter also referred to as "controller 140").

The information processing device 140 executes control of each component of the information processing system 10. In one example, the information processing device 140 generates information to be output from the output portion 130. In addition, in one example, the information processing device 140 incorporates the information, which is input by each of the image input portion 110, the operation input portion 115, and the sound collection portion 120, in the information to be output from the output portion 130. As illustrated in FIG. 3, the information processing device 140 is configured to include an input image acquisition portion 141, a sound information acquisition portion 142, an operation detection portion 143, a recognition control portion 144, a speech recognition portion 145, and an output control portion 146. Details of each of these functional blocks will be described later.

Moreover, the information processing device 140 may be composed of, for example, a central processing unit (CPU). In the case where the information processing device 140 is composed of a processing device such as CPU, this processing device can be composed of an electronic circuit.

The above description is given as to the functional configuration example of the information processing system 10 according to an embodiment of the present disclosure.

[1.3. Function Details of Information Processing System]

Subsequently, functions of the information processing system 10 according to an embodiment of the present disclosure are described in detail. In the embodiment of the present disclosure, the recognition control portion 144 controls the speech recognition portion 145 so that the speech recognition portion 145 performs the speech recognition processing on the sound information that is input from the sound collection portion 120. The recognition control portion 144 controls whether to continue the speech recognition processing on the basis of the user's gesture detected at predetermined timing.

Such a configuration makes it possible for the user to provide easily an instruction on whether to continue the speech recognition processing on the sound information. A parameter that is used to perform the control as to whether to continue the speech recognition processing is not limited to a particular one. An example in which the recognition control portion 144 controls whether to continue the speech recognition processing on the basis of the user's line of sight is described below. A technique of detecting the user's line of sight is not limited to a particular technique. In one example, it is possible for the operation detection portion 143 to detect the user's line of sight by analyzing an image that is input by the operation input portion 115. A viewpoint can be calculated as the intersection between the line of sight and the screen.

Figure 4:
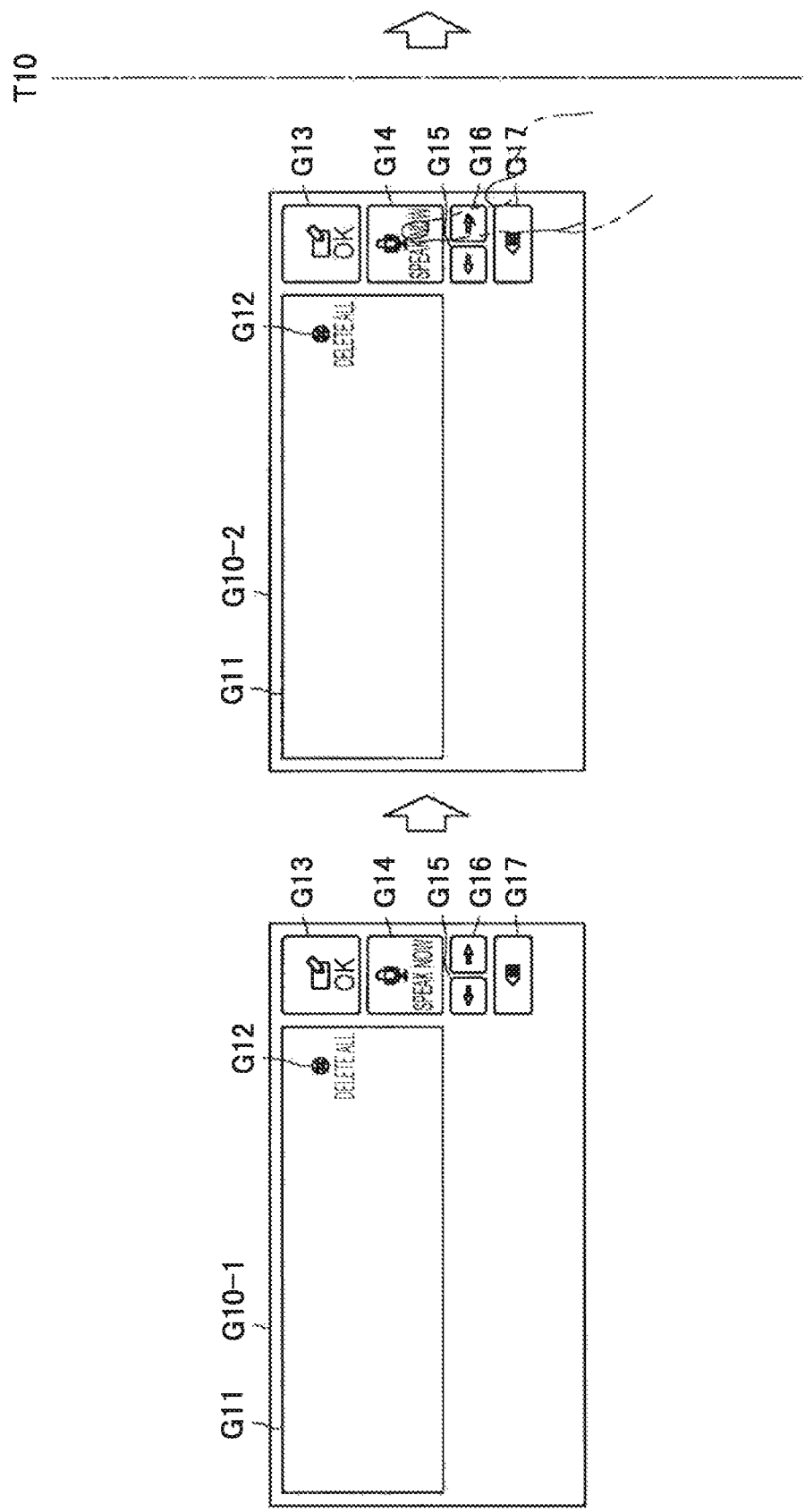
FIG. 4 is a diagram illustrating an example of screen transition from display of an initial screen to detection of an activation trigger of speech recognition processing.

FIG. 4 is a diagram illustrating an example of screen transition from display of an initial screen to detection of an activation trigger of the speech recognition processing. Referring to FIG. 4, the output control portion 146 displays an initial screen G10-1. The initial screen G10-1 includes a speech recognition start operation object G14 for starting the speech recognition processing and a recognition string display field G11 that is a display field of the string (also referred to as "recognition string") obtained by the speech recognition processing.

Further, the initial screen G10-1 includes a delete-all operation object G12 for deleting all the recognition strings and a decision operation object G13 for deleting the recognition string. In addition, the initial screen G10-1 includes a backward movement operation object G15, a forward movement operation object G16, and a deletion operation object G17. The backward movement operation object G15 is used to return the cursor position in the recognition string to backward, the forward movement operation object G16 is used to advance the cursor position in the recognition string to the front, and the deletion operation object G17 is used to delete the character or word at the cursor position.

First, as shown in the initial screen G10-2, when the user inputs an operation of selecting the speech recognition start operation object G14 through the operation input portion 115, the operation is detected by the operation detection portion 143 as an activation trigger of the speech recognition processing (time T10). When the activation trigger of the speech recognition processing is detected, the output control portion 146 activates a sound collection function of the sound collection portion 120. Moreover, the operation of selecting the speech recognition start operation object G14 as the activation trigger of the speech recognition processing is described herein as an example, but the activation trigger of the speech recognition processing is not limited to this example.

In one example, the activation trigger of the speech recognition processing may be an operation of depressing a hardware button for activating the speech recognition processing. In this case, the speech recognition processing may be started during the period from the depression of the hardware button to the release of the depression (Push to Talk). Alternatively, the activation trigger of the speech recognition processing may be the execution of a speech recognition processing start command (e.g., an utterance, "speech").

Alternatively, the activation trigger of the speech recognition processing may be an activation gesture of a predetermined speech recognition processing (e.g., swing hand up, swing hand down, motion of face (e.g., nodding and tilting the face to the left and right)). In addition, the activation trigger of the speech recognition processing may include an event in which the sound collection portion 120 acquires sound information having speech likeness exceeding a threshold. Subsequently, the user starts speaking an utterance toward the sound collection portion 120. The case where a silent state is started after completion of utterance of all the utterance contents that the user wants to be subjected to the speech recognition processing is now described with reference to FIG. 5.

Figure 5:
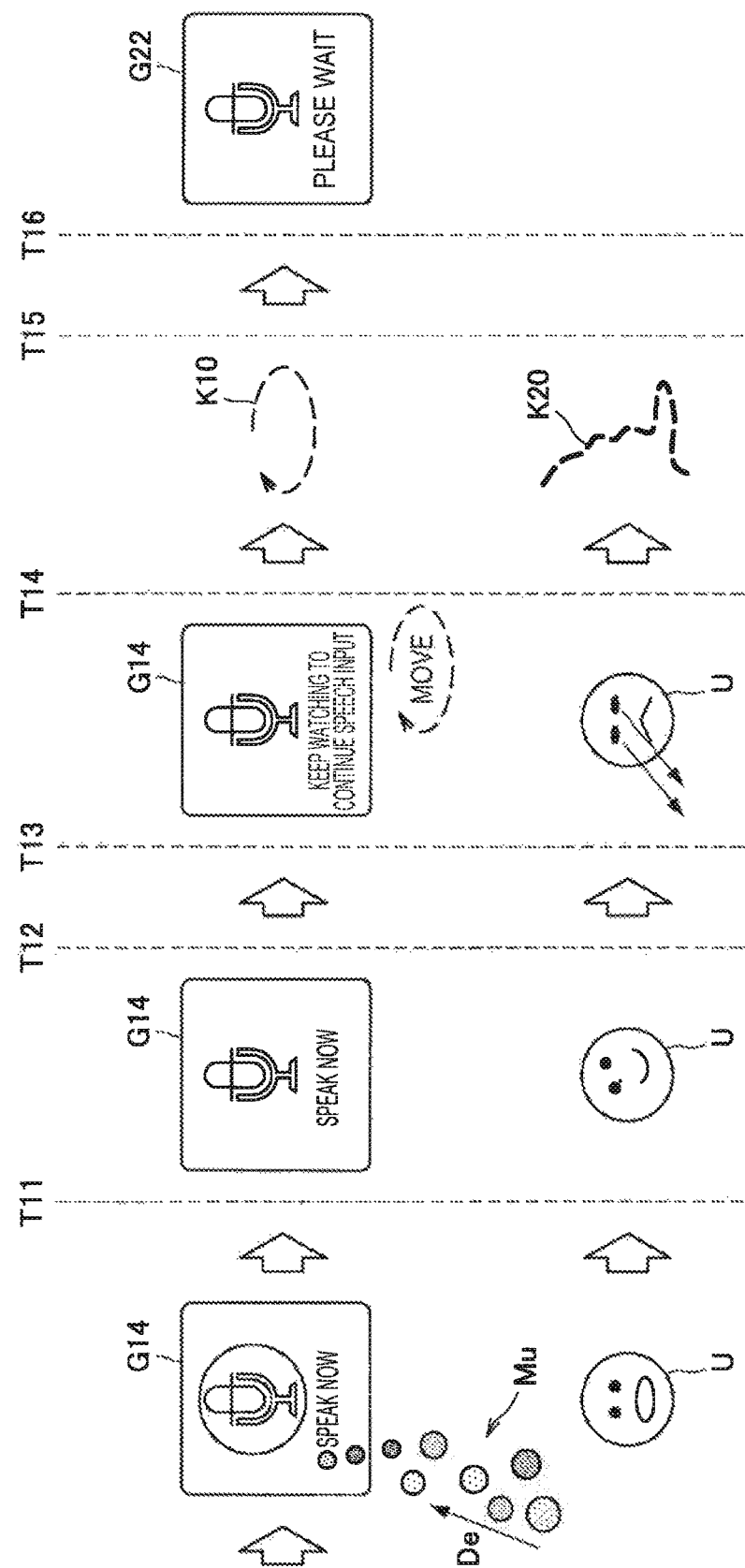
FIG. 5 is a diagram illustrated to describe a case where a silent state is started after completion of utterance of all the utterance contents that a user wants to be subjected to speech recognition processing.

When the sound information acquisition portion 142 acquires the sound information collected by the sound collection portion 120, the output control portion 146 causes a predetermined object (hereinafter also referred to as "display object") Mu to be displayed as illustrated in FIG. 5. The display object Mu may be stationary or may have motion. In one example, in a case where the display object Mu has motion, a movement direction De of the display object Mu may be determined depending on the arrival direction from a sound source of the user-uttered speech to the sound collection portion 120. Moreover, a technique of estimating the arrival direction of the user-uttered speech is not limited to a particular technique.

In one example, the recognition control portion 144 may estimate one arrival direction that is identical or similar to the finger direction of the user who performs the operation of selecting the speech recognition start operation object G14 (e.g., the direction from the base of the finger to the fingertip) as the arrival direction of the user-uttered speech. The range of similarity may be determined previously. In addition, the finger direction may be acquired by analyzing an input image.

Alternatively, the recognition control portion 144 may estimate the arrival direction of the sound input by the sound collection portion 120 as the arrival direction of the user-uttered speech. In a case where there are a plurality of sound arrival directions, the arrival direction of the sound that is initially input among the plurality of arrival directions may be estimated as the arrival direction of the user-uttered speech. Alternatively, one arrival direction that is identical or similar to the finger direction of the user performing the operation of selecting the speech recognition start operation object G14 may be estimated as the arrival direction of the user-uttered speech.

Alternatively, the recognition control portion 144 may estimate the arrival direction of the sound that is input with the largest sound volume by the sound collection portion 120 among the plurality of arrival directions as the arrival direction of the user-uttered speech. In this way, the arrival direction of the user-uttered speech can be estimated. On the other hand, the recognition control portion 144 may acquire the sound that is input by the sound collection portion 120 from the direction other than the arrival direction of the user-uttered speech as noise. Thus, the noise may also include sound that is output from the information processing system 10.

Further, FIG. 5 illustrates an example in which the output control portion 146 moves the display object Mu in the arrival direction (the movement direction De) of the user-uttered speech. This makes it possible for the user to intuitively know that the speech uttered by the user itself is collected by the sound collection portion 120. However, the motion of the display object Mu is not limited to such motion. In addition, FIG. 5 illustrates an example in which the destination of the display object Mu is the speech recognition start operation object G14. However, the destination of the display object Mu is not limited to this example.

Further, FIG. 5 illustrates an example in which the output control portion 146 moves the circular display object Mu appearing one after another depending on the sound collection by the sound collection portion 120, but the display form of the display object Mu is not limited to this example. In one example, the output control portion 146 may control various parameters of the display object Mu on the basis of predetermined information (e.g., speech likeness and sound volume of sound information) corresponding to the sound information. The sound information used in this case may be the sound information from the arrival direction of the user-uttered speech. In addition, the parameter of the display object Mu may include at least one of the shape, transparency, color, size, and motion of the display object Mu.

The technique of evaluating speech likeness from sound information is not limited to a particular technique. In one example, as the technique of evaluating speech likeness from sound information, it is also possible to employ the technique disclosed in Patent Literature (JP 2010-038943A). In addition, in one example, as the technique of evaluating speech likeness from sound information, it is also possible to employ the technique disclosed in Patent Literature (JP 2007-328228A). An example in which the output control portion 146 evaluates speech likeness will be described herein, but a server (not illustrated) may evaluate speech likeness.

Subsequently, the recognition control portion 144 causes the speech recognition portion 145 to start the speech recognition processing on the sound information acquired by the sound information acquisition portion 142. The timing to start the speech recognition processing is not limited to particular timing. In one example, the recognition control portion 144 may cause the speech recognition portion 145 to start it after the sound information having speech likeness exceeding a predetermined threshold is collected. Alternatively, the recognition control portion 144 may cause the speech recognition portion 145 to start the speech recognition processing on the sound information corresponding to the display object Mu after the display object Mu reaches the speech recognition start operation object G14.

Here, in a case where the silent state remains unchanged after completion of utterance of all the utterance contents that the user wants to be subjected to the speech recognition processing (time T11) as illustrated in FIG. 5, the recognition control portion 144 detects the silent section (time T12). Then, when the silent section is detected, the output control portion 146 causes the output portion 130 to output a motion object (time T13). In the example illustrated in FIG. 5, although the output control portion 146 causes the speech recognition start operation object G14 having motion to be output as a motion object, the motion object may be provided separately from the speech recognition start operation object G14.

Subsequently, the recognition control portion 144 controls whether to continue the speech recognition processing on the basis of the user's viewpoint and the motion object G14. More specifically, the recognition control portion 144 controls whether to continue the speech recognition processing on the basis of the degree of coincidence between the user's viewpoint and the motion object G14. The degree of coincidence will be described in detail later. Here, the utterance of all the utterance contents that the user wants to be subjected to the speech recognition processing is completed, and thus it may be unnecessary for the user to keep watching the motion object G14.

If the user does not keep watching the motion object G14, the degree of coincidence between a trajectory K10 of the motion object and a trajectory K20 of the user's viewpoint falls below a threshold. Thus, when the degree of coincidence between both of them falls below the threshold at predetermined timing, the recognition control portion 144 controls the speech recognition portion 145 so that the speech recognition portion 145 executes the execution operation based on the result of the speech recognition processing (time T15). The predetermined timing is not limited to particular timing as long as it is the timing after the motion object G14 is output by the output portion 130.

Subsequently, the speech recognition portion 145 executes an execution operation based on the result of the speech recognition processing under the control of the recognition control portion 144 (time T16). In this case, while the execution operation based on the result of the speech recognition processing is performed, the output control portion 146 may cause the object G22 for instructing to wait for the speech input until the execution operation is completed to be output. When the execution operation is completed, the output control portion 146 can cause the result of the execution operation to be output.

Figure 6:
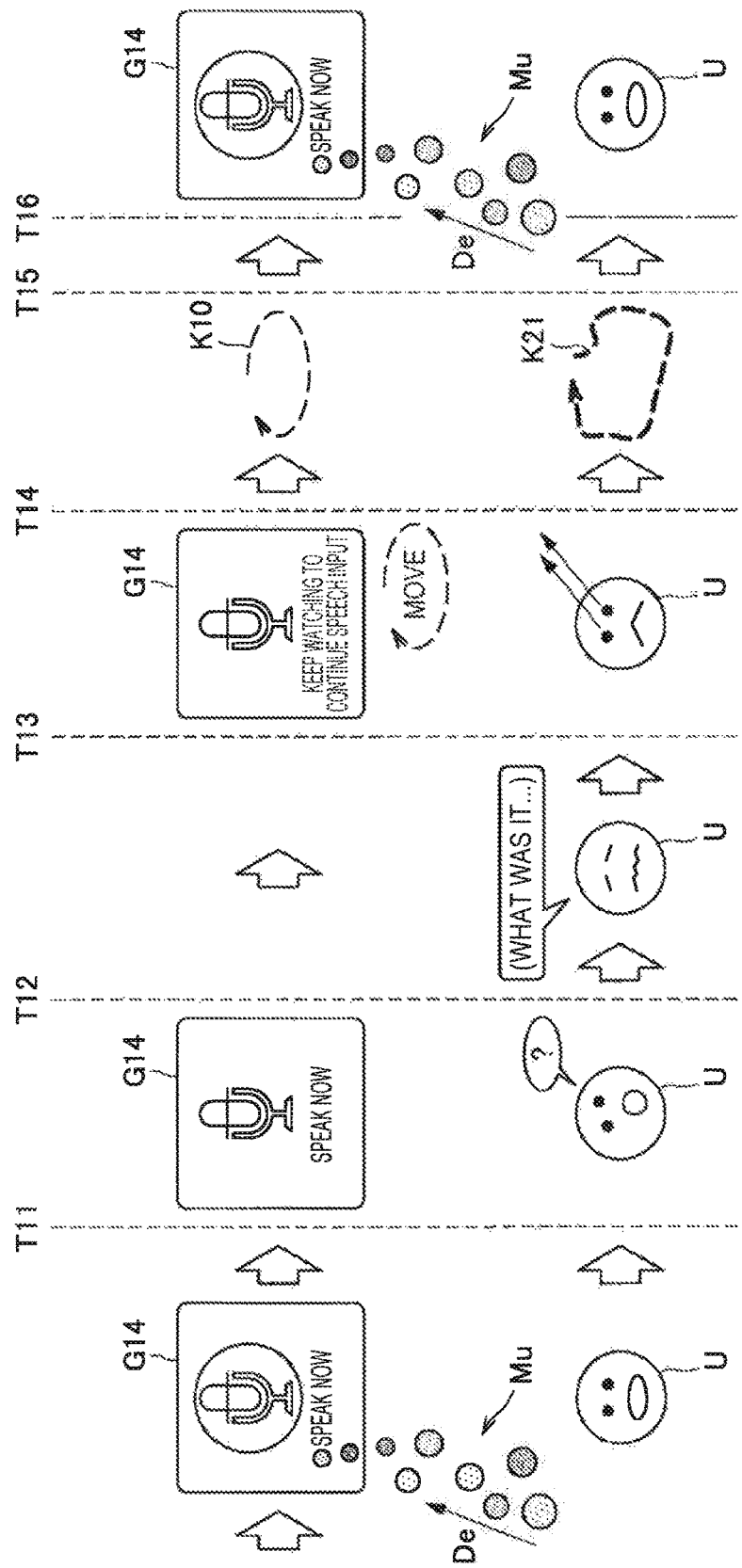
FIG. 6 is a diagram illustrated to describe a case where a silent state is started before completion of utterance of all the utterance contents that the user wants to be subjected to the speech recognition processing.

Subsequently, a case where the silent state is started before completion of utterance of all the utterance contents that the user wants to be subjected to the speech recognition processing is described with reference to FIG. 6. First, when the sound information acquisition portion 142 acquires the sound information collected by the sound collection portion 120, the output control portion 146 causes the display object Mu to be displayed as illustrated in FIG. 6. The display object Mu has been described above. Subsequently, the recognition control portion 144 causes the speech recognition portion 145 to start the speech recognition processing on the sound information acquired by the sound information acquisition portion 142. The timing to start the speech recognition processing is not limited to particular timing as described above.

Here, when the silent state remains unchanged before completion of utterance of all the utterance contents that the user wants to be subjected to the speech recognition processing as illustrated in FIG. 6, the recognition control portion 144 detects the silent section (time T12). Then, in the case where the silent section is detected, the output control portion 146 causes the output portion 130 to output the motion object (time T13). In the example illustrated in FIG. 6, although the output control portion 146 causes the speech recognition start operation object G14 having motion to be output as the motion object, the motion object may be provided separately from the speech recognition start operation object G14.

Subsequently, the recognition control portion 144 controls whether to continue the speech recognition processing on the basis of the user's viewpoint and the motion object G14. More specifically, the recognition control portion 144 controls whether to continue the speech recognition processing on the basis of the degree of coincidence between the user's viewpoint and the motion object G14. In this case, not all the utterance contents that the user wants to be subjected to the speech recognition processing are completed, so the user is necessary to keep watching the motion object G14.

When the user keeps watching the motion object G14, the degree of coincidence between the trajectory K10 of the motion object and a trajectory K21 of the user's viewpoint exceeds a threshold. Thus, in a case where the degree of coincidence between the both exceed the threshold at predetermined timing, the recognition control portion 144 may control the speech recognition portion 145 so that the speech recognition portion 145 continues the speech recognition processing (time T15). The predetermined timing is not limited to particular timing as long as it is the timing after the motion object G14 is output by the output portion 130.

Subsequently, the speech recognition portion 145 continues the speech recognition processing on the sound information that is input from the sound collection portion 120 under the control of the recognition control portion 144 (time T16). This allows the temporarily stopped speech recognition processing to be resumed. Moreover, when the sound information collected by the sound collection portion 120 starts to be acquired again by the sound information acquisition portion 142, the output control portion 146 may cause the display object Mu to be displayed again as illustrated in FIG. 6.

Further, when predetermined timing arrives, it is also envisaged that the execution operation based on the result of the speech recognition processing is automatically started. In order to address such a case, the speech recognition portion 145 may start additional speech recognition processing different from that is activated previously and may merge two results obtained by the respective speech recognition processing. Alternatively, the speech recognition portion 145 may buffer the speech recognition processing, and then, when the speech recognition processing can be started, the speech recognition portion 145 may perform the speech recognition processing on the basis of the buffered sound information and the sound information that is input from the sound collection portion 120.

Figure 7:
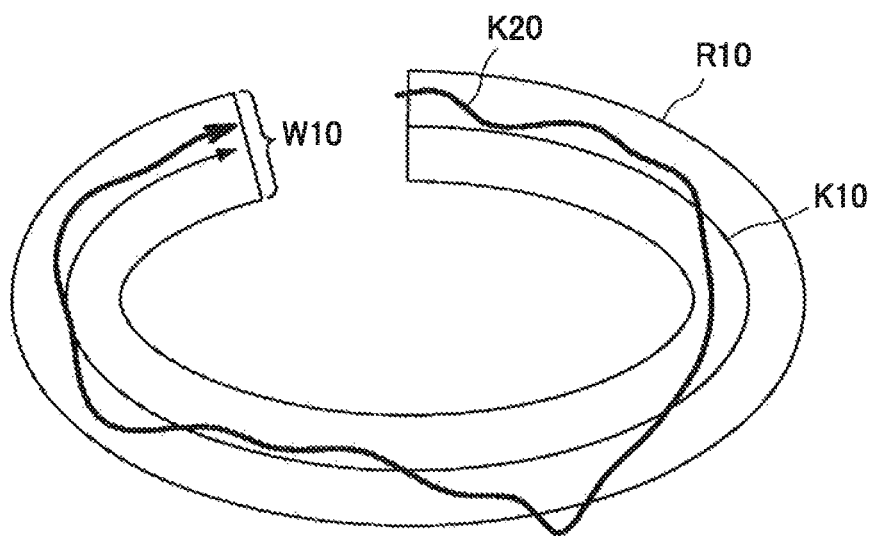
FIG. 7 is a diagram illustrated to describe a case where the degree of coincidence exceeds a threshold.
Figure 8:
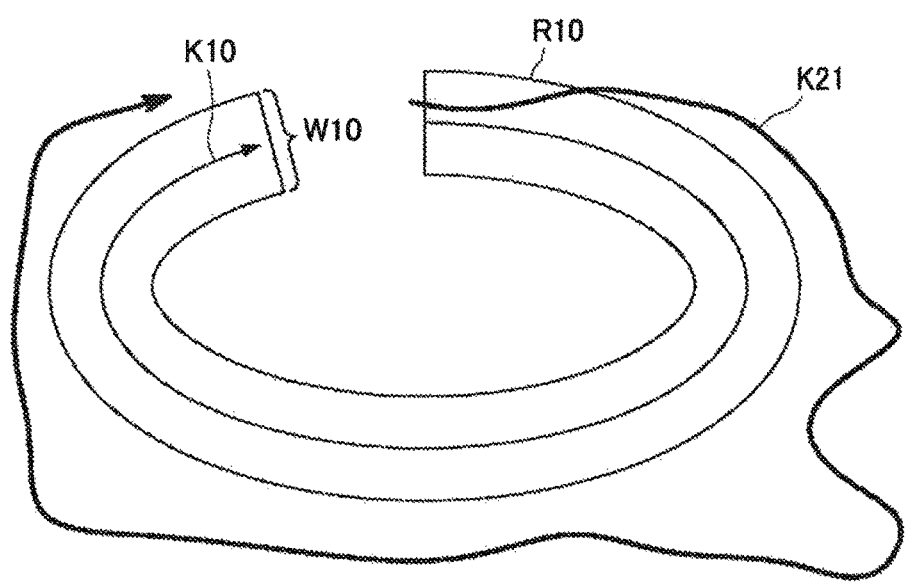
FIG. 8 is a diagram illustrated to describe a case where the degree of coincidence falls below a threshold.

The degree of coincidence between the user's viewpoint and the motion object G14 is described now in more detail with reference to FIGS. 7 and 8. FIG. 7 is a diagram illustrated to describe a case where the degree of coincidence exceeds a threshold. As illustrated in FIG. 7, the trajectory K10 of the motion object is assumed to correspond to a determination region R10. In the example illustrated in FIG. 7, the determination region R10 is a region having a width W10 based on the trajectory K10 of the motion object as a reference, but the determination region R10 is not limited to such a region.

Then, the recognition control portion 144 may calculate a ratio of the length of the trajectory K20 of the user's viewpoint within the determination region R10 to the total length of the trajectory K20 of the user's viewpoint as the degree of coincidence. In the example illustrated in FIG. 7, the degree of coincidence calculated in this manner exceeds a threshold, so the recognition control portion 144 may control the speech recognition portion 145 so that the speech recognition portion 145 continues the speech recognition processing. However, the technique of calculating the degree of coincidence between the trajectory K10 of the motion object and the trajectory K21 of the user's viewpoint is not limited to this example.

On the other hand, FIG. 8 is a diagram illustrated to describe a case where the degree of coincidence falls below a threshold. In the example illustrated in FIG. 8, the degree of coincidence calculated as described above falls below the threshold, so the recognition control portion 144 controls the speech recognition portion 145 so that the speech recognition portion 145 executes the execution operation based on the result of the speech recognition processing. Moreover, in the case where the degree of coincidence is equal to the threshold, the recognition control portion 144 may control the speech recognition portion 145 so that the speech recognition portion 145 continues the speech recognition processing or executes the execution operation based on the result of the speech recognition processing.

Figure 9:
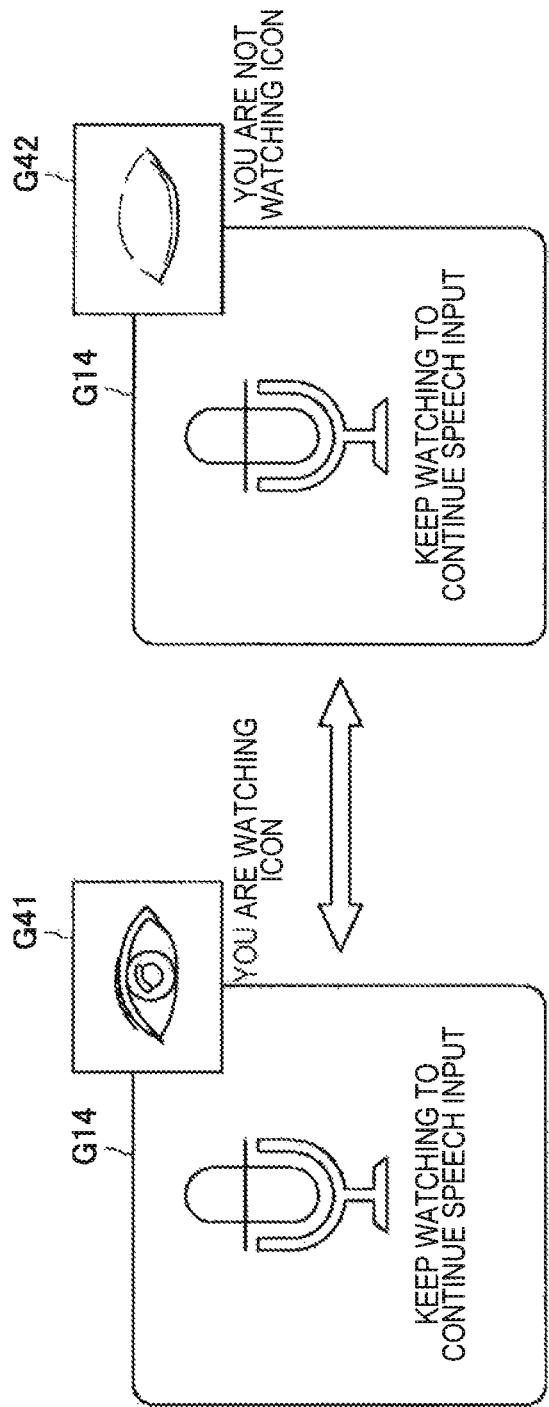
FIG. 9 is a diagram illustrating an output example of a relationship between the degree of coincidence and the threshold.

Further, the relationship between the degree of coincidence calculated as described above and the threshold may be output in the firm that the user can perceive. FIG. 9 is a diagram illustrating an example of output of the relationship between the degree of coincidence and the threshold. As illustrated in FIG. 9, in a case where the degree of coincidence exceeds the threshold, the output control portion 146 may cause the output portion 130 to output a predetermined first notification object G41. In the example illustrated in FIG. 9, the first notification object G41 is an icon representing a state in which the eyes are open, but this is not limited to such an example.

On the other hand, as illustrated in FIG. 9, when the degree of coincidence falls below the threshold, the output control portion 146 may cause the output portion 130 to output a predetermined second notification object G42 different from the first notification object G41. In the example illustrated in FIG. 9, the second notification object G42 is an icon representing a state in which the eyes are closed, but this is not limited to such an example. Moreover, the output control portion 146 may stop outputting the motion object G14 when the state in which the degree of coincidence falls below the threshold continues beyond a predetermined time.

Figure 10:
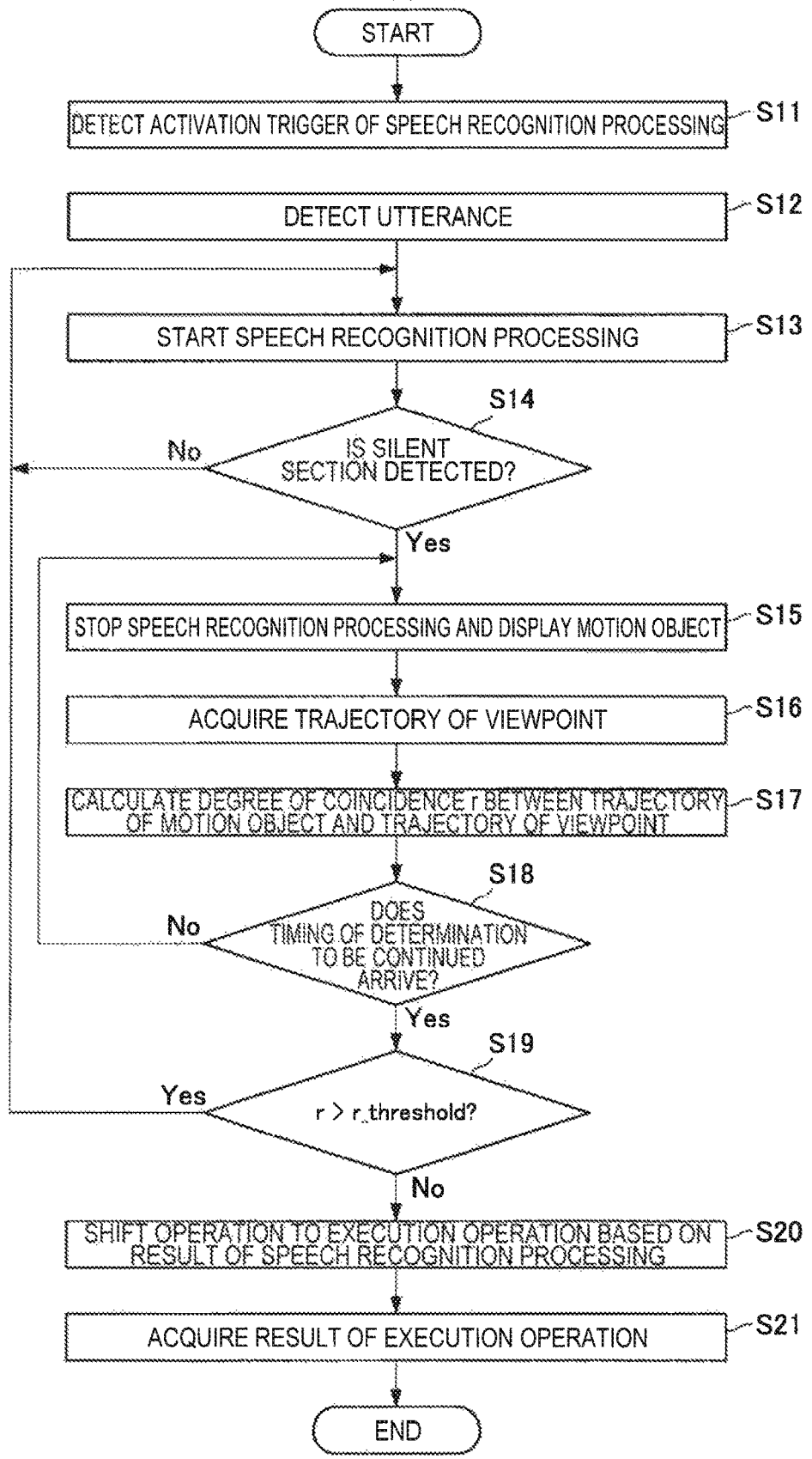
FIG. 10 is a flowchart illustrating the overall operation procedure of the information processing system according to an embodiment of the present disclosure.

Subsequently, the overall operation procedure of the information processing system 10 according to an embodiment of the present disclosure is described with reference to FIG. 10. Moreover, the flowchart of FIG. 10 is merely an example of the overall operation procedure of the information processing system 10 according to an embodiment of the present disclosure. Thus, the overall operation procedure of the information processing system 10 according to an embodiment of the present disclosure is not limited to the example illustrated in the flowchart of FIG. 10.

First, as illustrated in FIG. 10, the operation detection portion 143 detects an activation trigger of the speech recognition processing (S11). The recognition control portion 144, when detecting an utterance from sound information that is input from the sound collection portion 120 (S12), causes the speech recognition portion 145 to start the speech recognition processing on the sound information (S13). Subsequently, the recognition control portion 144 causes the speech recognition processing to be continued until a silent section is detected ("No" in S14), but when the silent section is detected ("Yes" in S14), the recognition control portion 144 temporarily stops the speech recognition processing, and the output control portion 146 causes a motion object to be displayed (S15).

Then, the recognition control portion 144 acquires the trajectory K20 of the user's viewpoint (S16), and calculates a degree of coincidence, r, between the trajectory K10 of the motion object and the trajectory K20 of the user's viewpoint (S17). While the timing of the determination to be continued does not arrive ("No" in S18), the recognition control portion 144 shifts the operation to S15. However, in the case where the timing of the determination to be continued arrives ("Yes" in S18), the recognition control portion 144 shifts the operation to S19.

Subsequently, in a case where the degree of coincidence, r, exceeds a threshold r_threshold ("Yes" in S19), the recognition control portion 144 causes the speech recognition processing to continue (S13). On the other hand, in a case where the degree of coincidence, r, does not exceed the threshold r_threshold ("No" in S19), the recognition control portion 144 shifts the operation to the execution operation based on the result of the speech recognition processing (S20) and acquires a result of the execution operation (S21).

The function details of the information processing 10 according to an embodiment of the present disclosure are described above.

[1.4. Modified Example of System Configuration]

Figure 11:
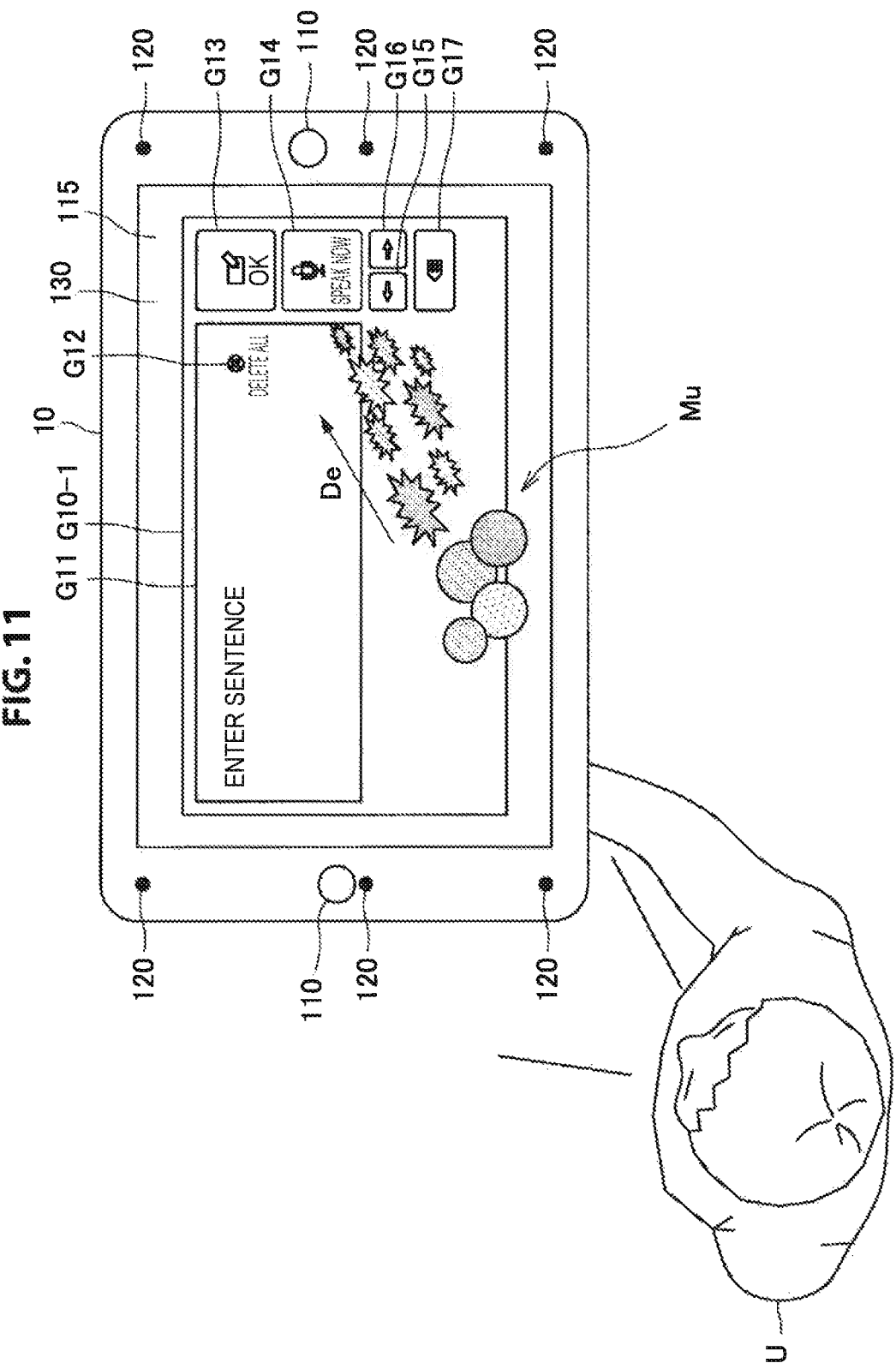
FIG. 11 is a diagram illustrating a modified example 1 of the configuration of the information processing system.

In the above, the example in which the output portion 130 is a projector capable of projecting a screen onto the top surface of the table Tbl is described. However, the system configuration of the information processing system 10 is not limited to this example. A modified example of the system configuration of the information processing system 10 is described below. FIG. 11 is a diagram illustrating a modified example 1 of the configuration of the information processing system 10. As illustrated in FIG. 11, in a case where the information processing system 10 is a mobile terminal, the output portion 130 may be provided in the mobile terminal. The type of the mobile terminal is not limited to a particular type, and it may be a tablet terminal, a smartphone, or a cellular phone.

Further, FIGS. 12 to 15 are diagrams illustrating a modified example 2 of the configuration of the information processing system 10. As illustrated in FIGS. 12 to 15, the output portion 130 is a television set, the information processing device 140 is a game console, and the operation input portion 115 may be a controller for operating the game console.

Figure 12:
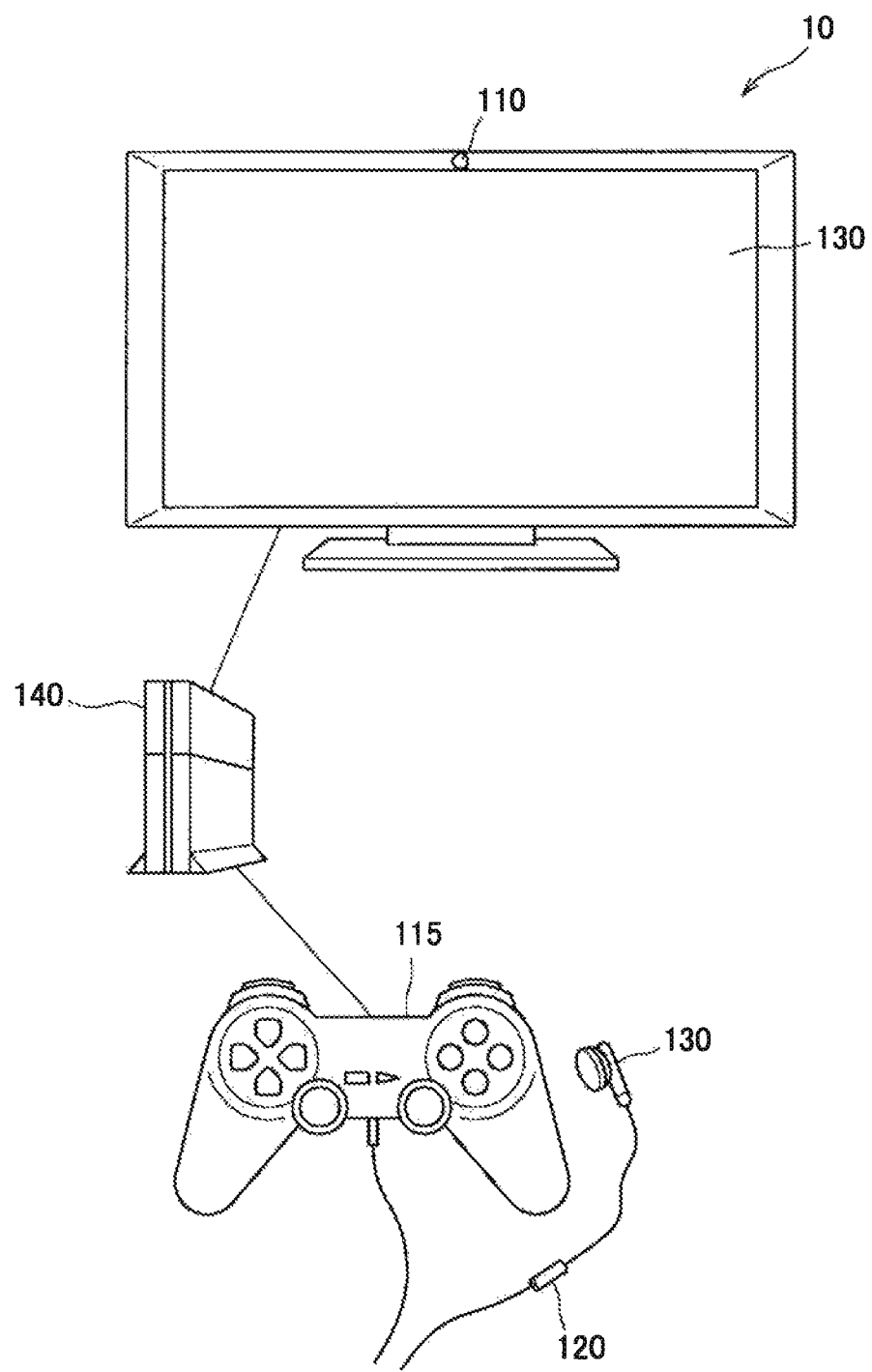
FIG. 12 is a diagram illustrating a modified example 2 of the configuration of the information processing system.
Figure 13:
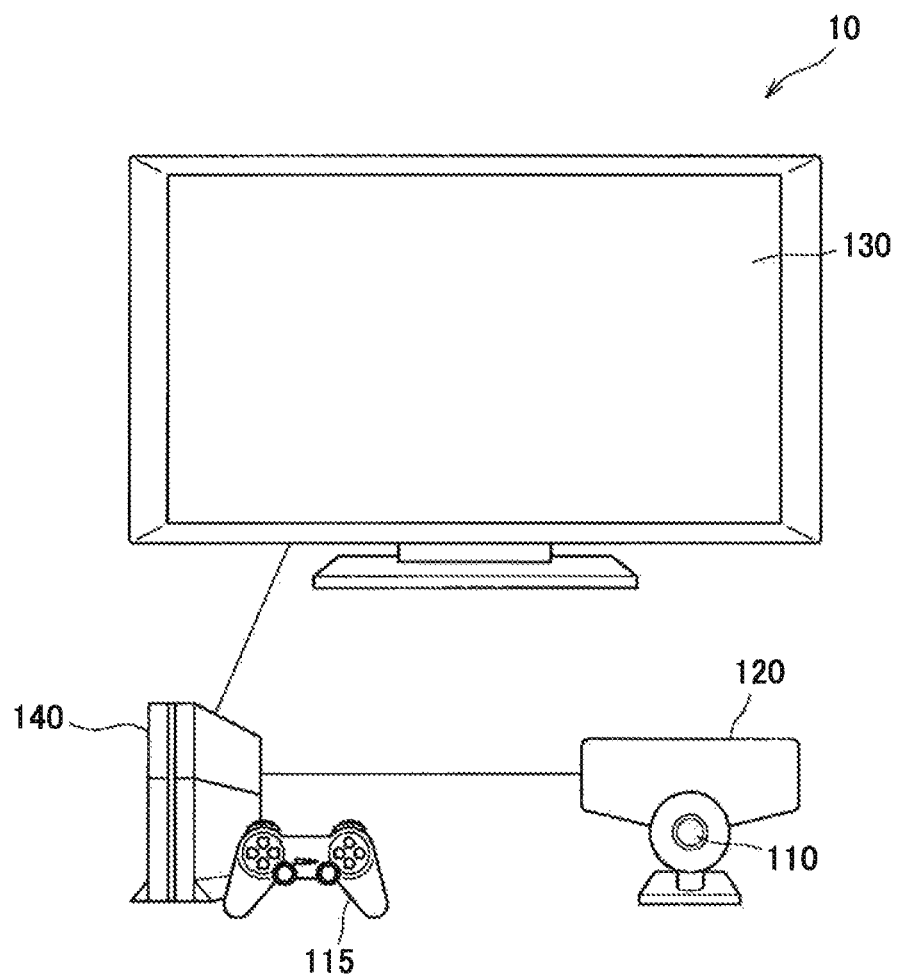
FIG. 13 is a diagram illustrating the modified example 2 of the configuration of the information processing system.
Figure 14:
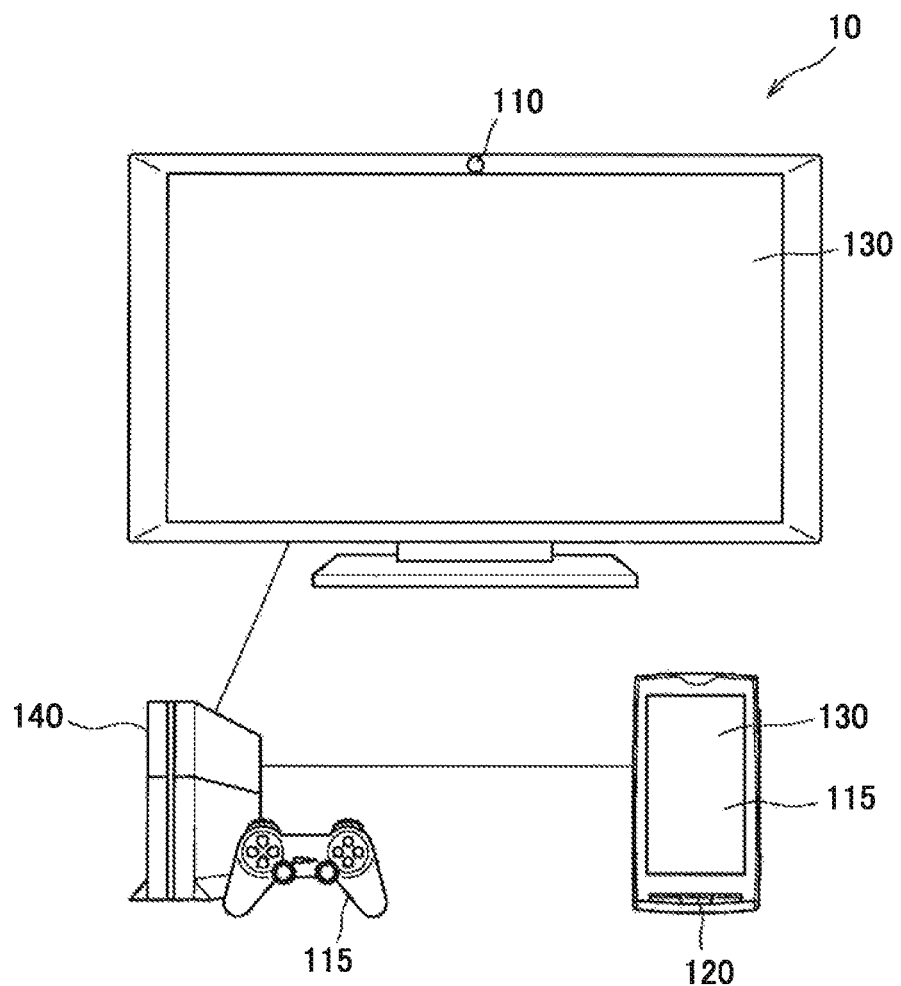
FIG. 14 is a diagram illustrating the modified example 2 of the configuration of the information processing system.
Figure 15:
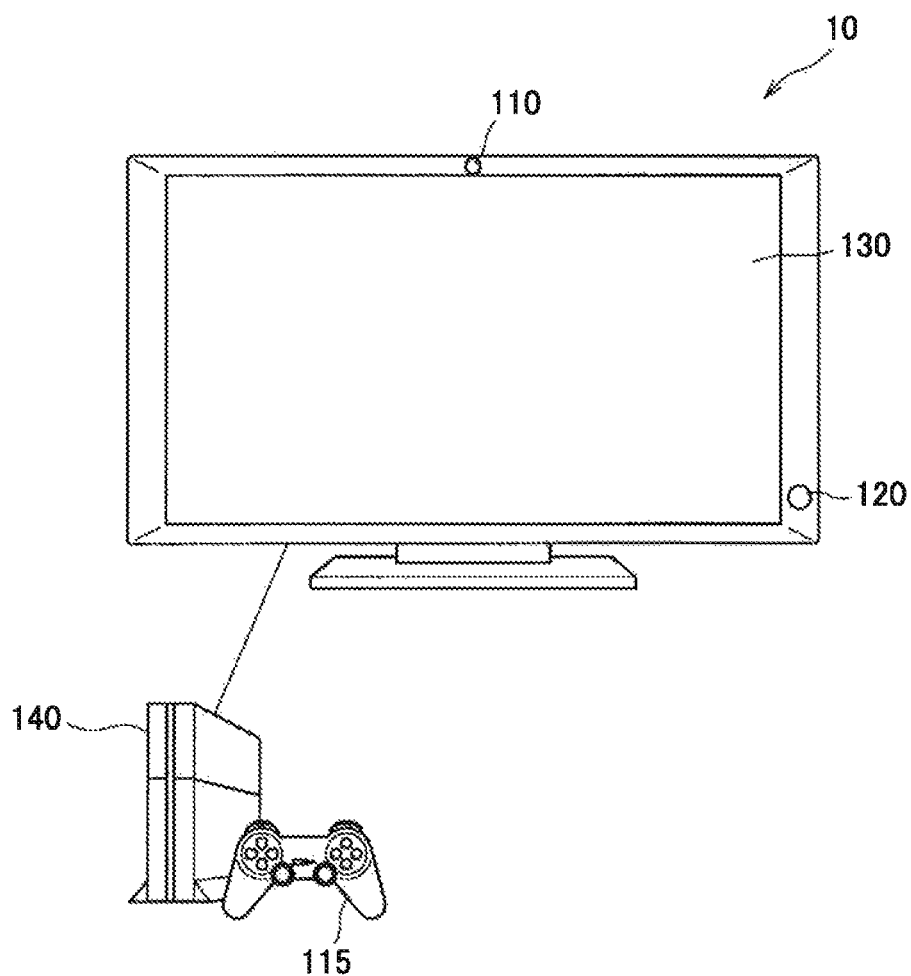
FIG. 15 is a diagram illustrating the modified example 2 of the configuration of the information processing system.

Further, as illustrated in FIG. 12, the sound collection portion 120 and the output portion 130 may be connected to the operation input portion 115. In addition, as illustrated in FIG. 13, the image input portion 110 and the sound collection portion 120 may be connected to the information processing device 140. In addition, as illustrated in FIG. 14, the operation input portion 115, the sound collection portion 120, and the output portion 130 may be provided in a smartphone connected to the information processing device 140. In addition, as illustrated in FIG. 15, the sound collection portion 120 may be provided in a television set.

Figure 16:
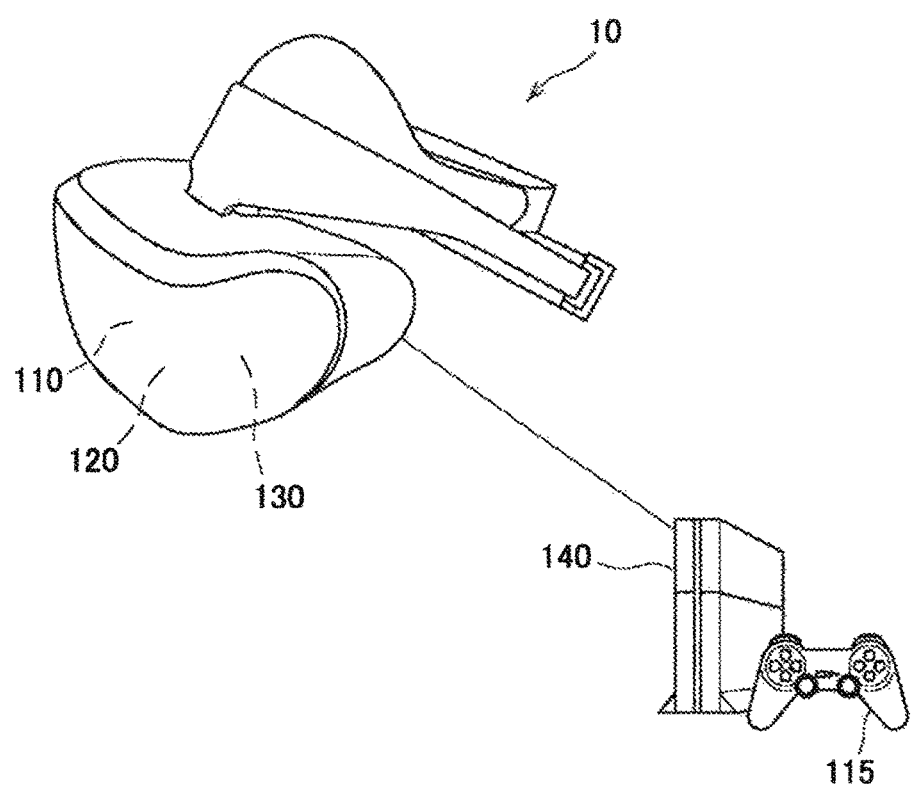
FIG. 16 is a diagram illustrating a modified example 3 of the configuration of the information processing system.

Further, FIG. 16 is a diagram illustrating a modified example 3 of the configuration of the information processing system 10. As illustrated in FIG. 16, the information processing device 140 is a game console, and the operation input portion 115 may be a controller for operating the game console. In addition, as illustrated in FIG. 16, the output portion 130, the sound collection portion 120, and the image input portion 110 may be provided in a wearable device worn on the user's head.

Figure 17:
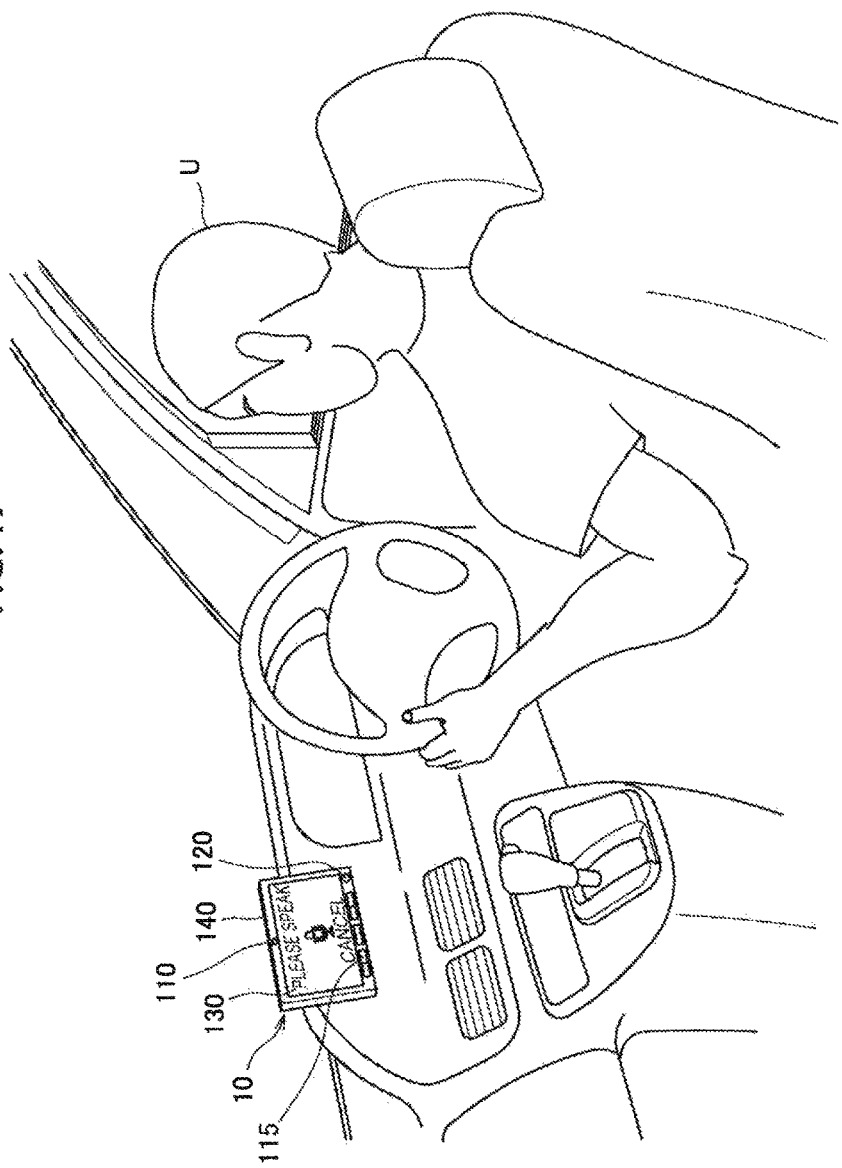
FIG. 17 is a diagram illustrating a modified example 4 of the configuration of the information processing system.
Figure 18:
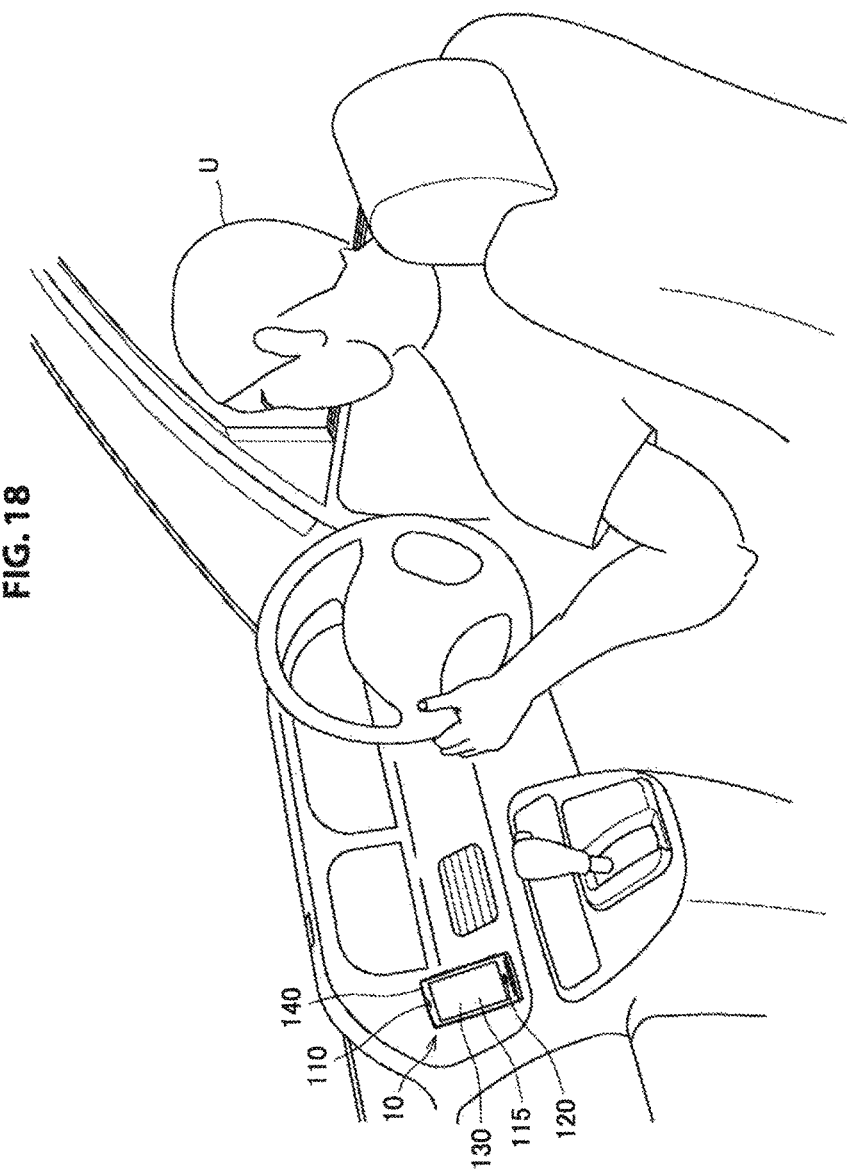
FIG. 18 is a diagram illustrating the modified example 4 of the configuration of the information processing system.

FIGS. 17 to 20 are diagrams illustrating a modified example 4 of the configuration of the information processing system 10. As illustrated in FIG. 17, the information processing system 10 may be installed in an in-vehicle navigation system attachable to an automobile and may be used by the user U who drives the automobile. In addition, as illustrated in FIG. 18, the information processing system 10 may be installed in a mobile terminal and may be used by the user U who drives the automobile. As described above, the type of mobile terminal is not limited to a particular type.

Figure 19:
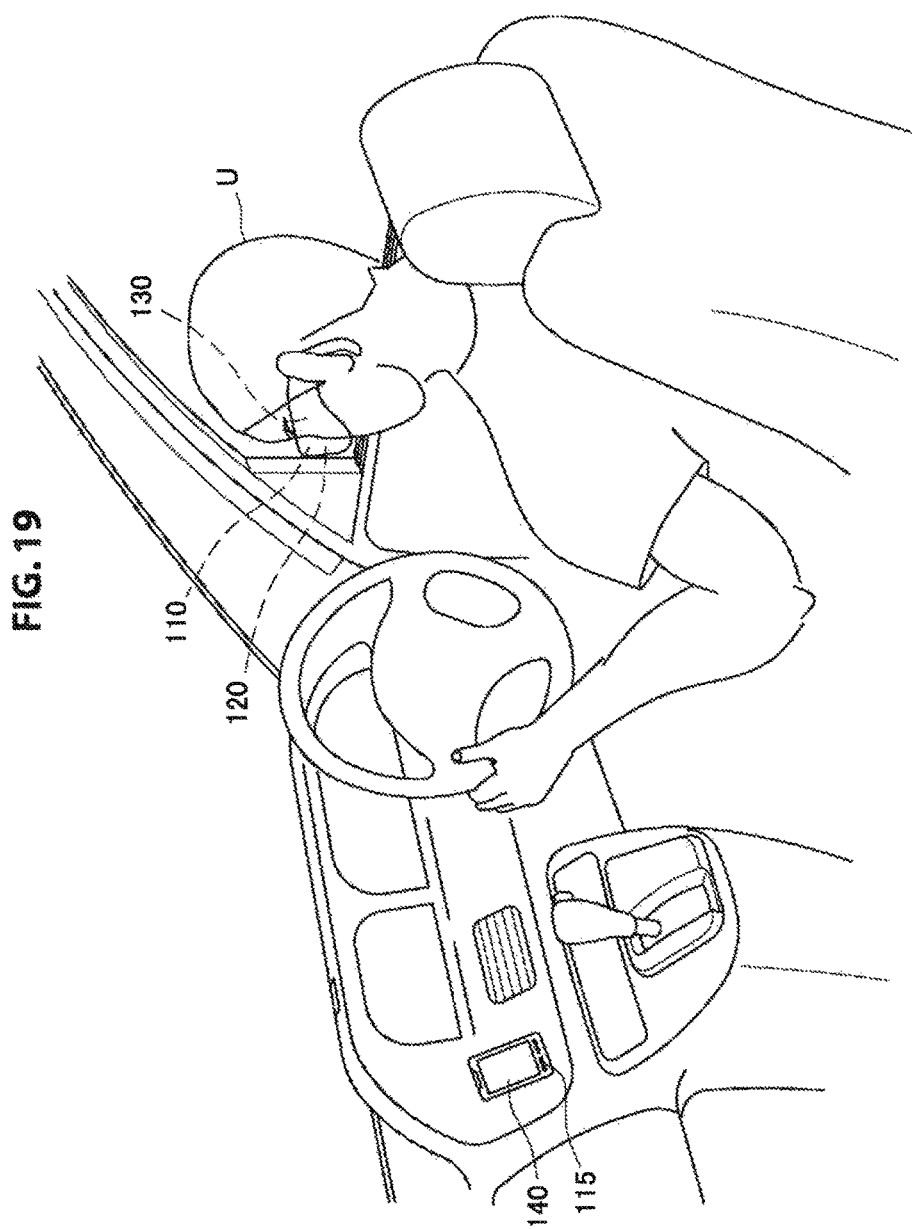
FIG. 19 is a diagram illustrating the modified example 4 of the configuration of the information processing system.
Figure 20:
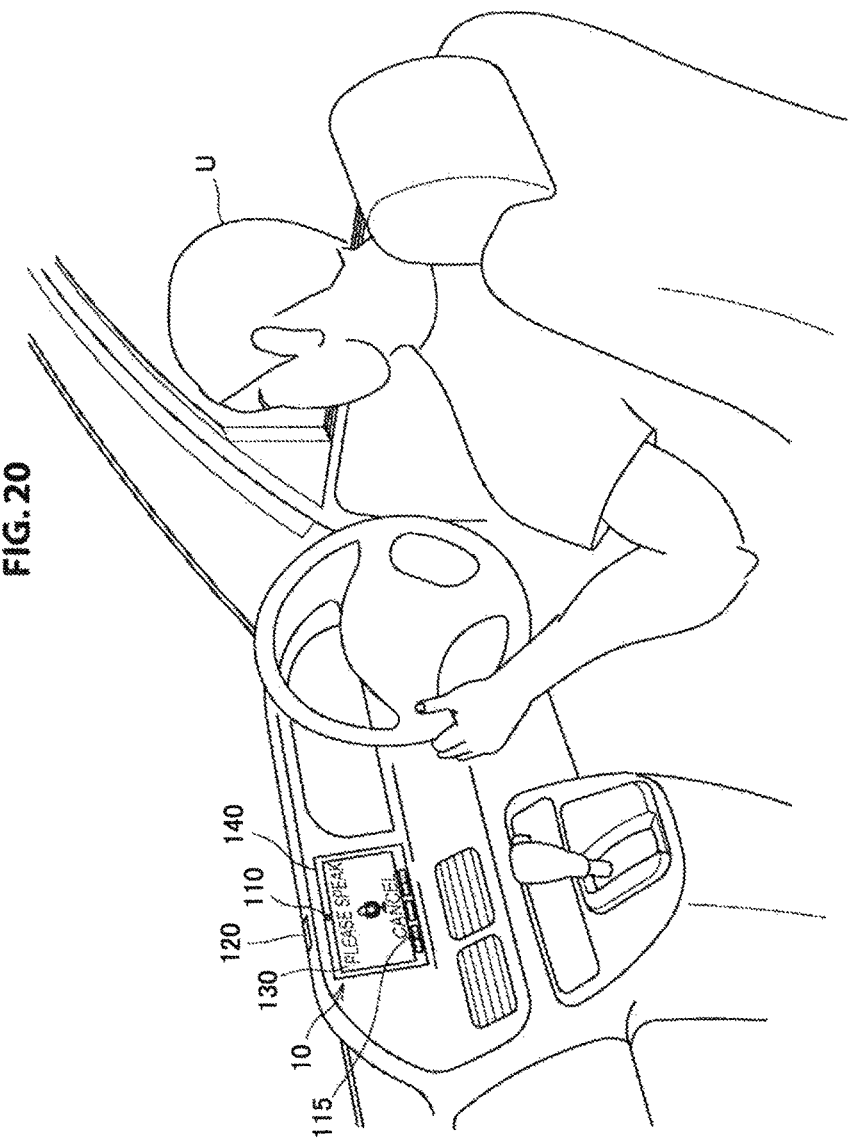
FIG. 20 is a diagram illustrating the modified example 4 of the configuration of the information processing system.

Further, as illustrated in FIG. 19, the operation input portion 115 of the information processing system 10 may be provided in a mobile terminal. The output portion 130, the sound collection portion 120, and the image input portion 110 of the information processing system 10 may be provided in a wearable device worn on the body of the user U. Further, as illustrated in FIG. 20, the information processing system 10 may be installed in an in-vehicle navigation system incorporated in an automobile and may be used by the user U who drives the automobile.

[1.5. Display Mode of Motion Object]

Figure 21:
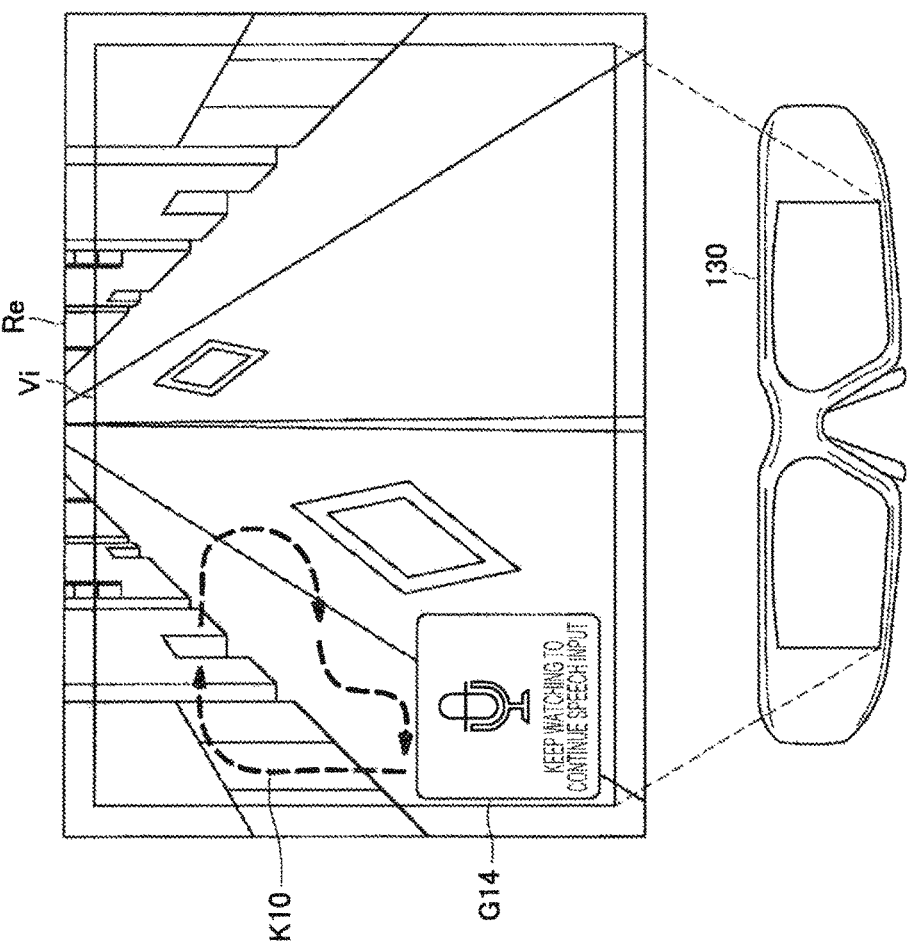
FIG. 21 is a diagram illustrating an example in which a motion object is displayed in a view field area in a three-dimensional space.

In the above, the display of the motion object G14 is described. Here, the display mode of the motion object G14 is not limited to a particular mode. FIG. 21 is a diagram illustrating an example in which the motion object G14 is displayed in the view field area in the three-dimensional space. In one example, as illustrated in FIG. 21, in a case where the output portion 130 is a see-through head-mounted display, the output portion 130 may display the motion object G14 in the view field area Vi in the three-dimensional space Re. In addition, FIG. 21 illustrates the trajectory K10 of the motion object. It is possible to continue the speech recognition processing by keeping watching the motion object G14 that is displayed in this way.

Figure 22:
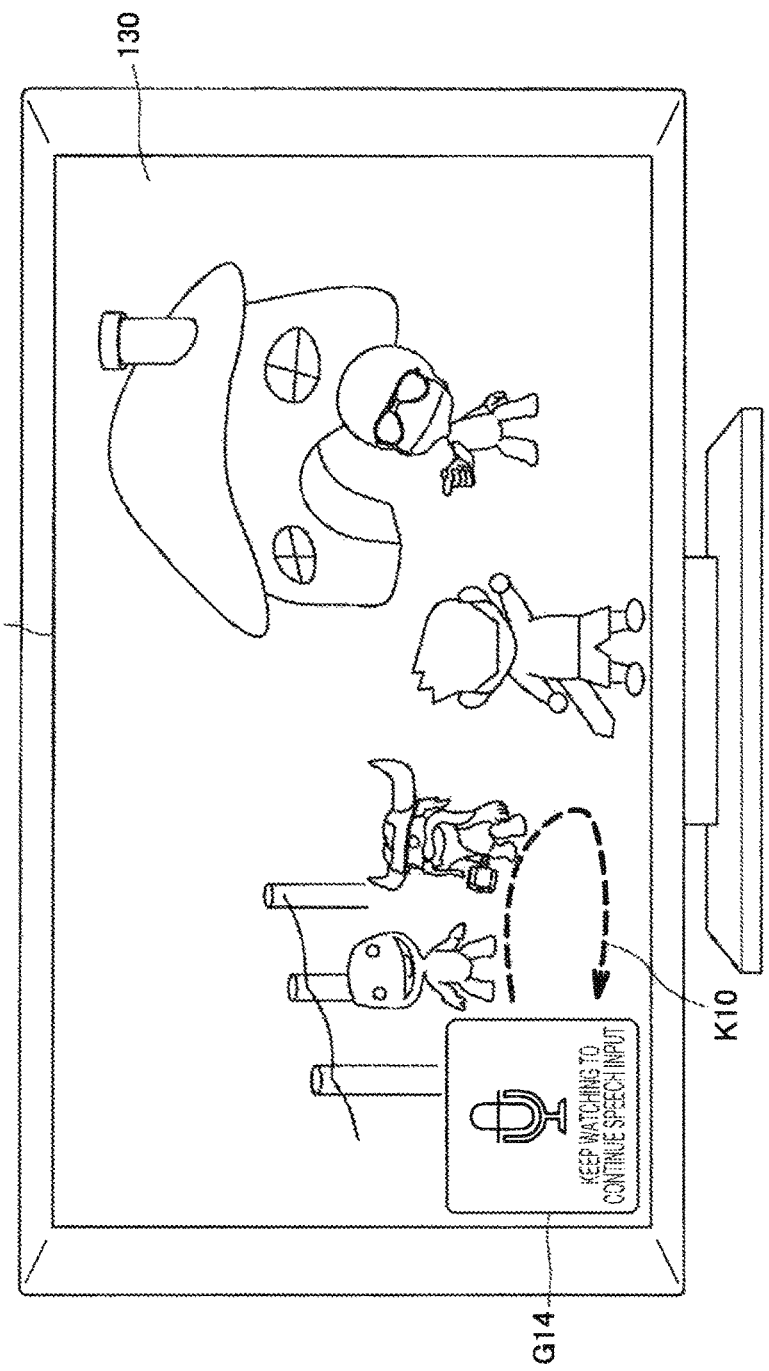
FIG. 22 is a diagram illustrating an example in which a motion object is displayed to be superimposed on a virtual image.

FIG. 22 is a diagram illustrating an example in which the motion object G14 is displayed to be superimposed on a virtual image. In one example, as illustrated in FIG. 22, in a case where the output portion 130 is a television set, the output portion 130 may superimpose the motion object G14 on a virtual image such as a game screen and may display it. In addition, FIG. 21 illustrates the trajectory K10 of the motion object. It is possible to continue the speech recognition processing by keeping watching the motion object G14 that is displayed in this way. Moreover, instead of the television set, a wearable device or the like worn on the user's head may be used.

[1.6. Modified Example of User's Gesture]

In the above, the example in which the recognition control portion 144 controls whether to continue the speech recognition processing on the basis of the user's line of sight is described. However, the example of controlling whether to continue the speech recognition processing is not limited to this example. In one example, the recognition control portion 144 may control whether to continue the speech recognition processing on the basis of the tilt of the user's head. Such an example is described with reference to FIGS. 23 and 24.

Figure 23:
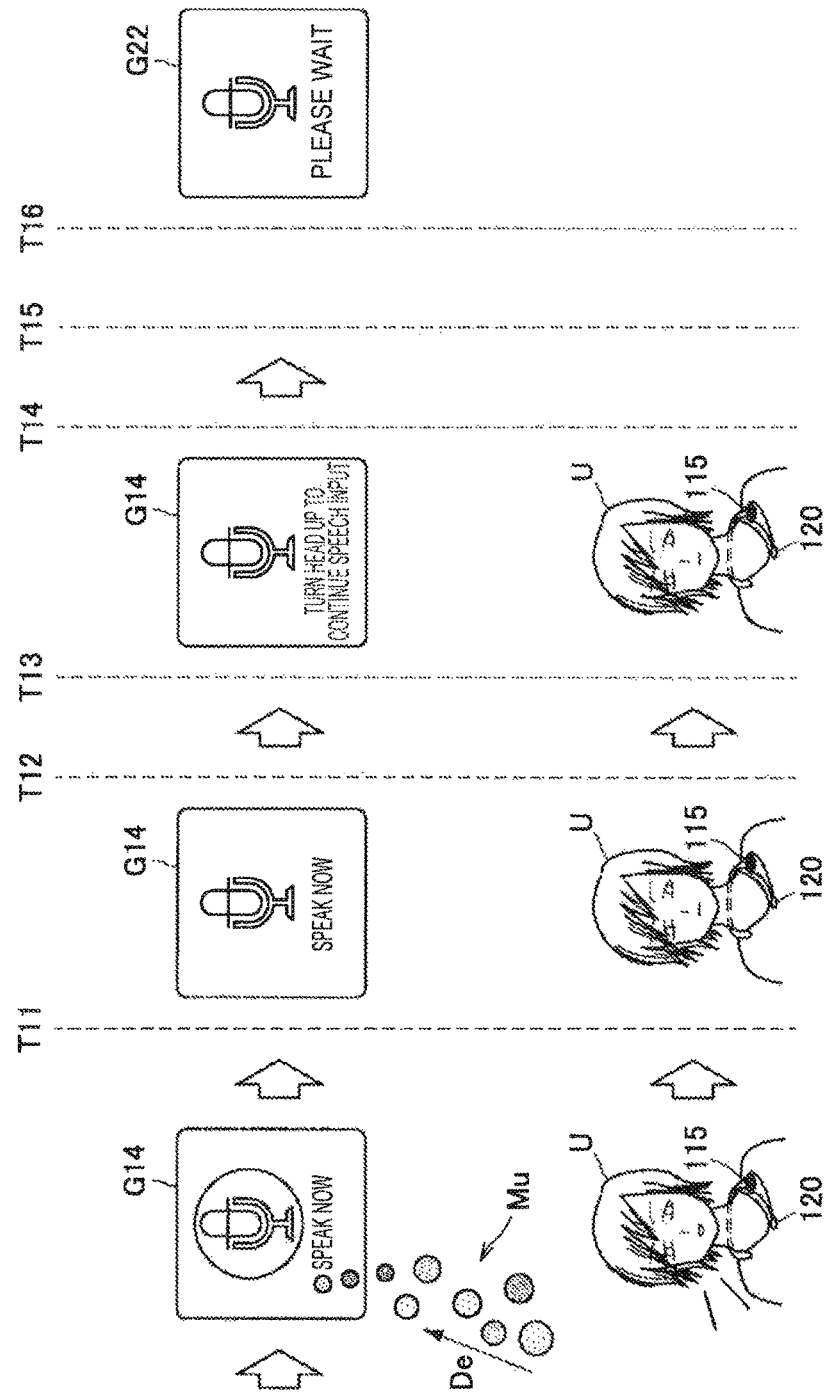
FIG. 23 is a diagram illustrated to describe a case where a silent state is started after completion of utterance of all the utterance contents that the user wants to be subjected to the speech recognition processing.
Figure 24:
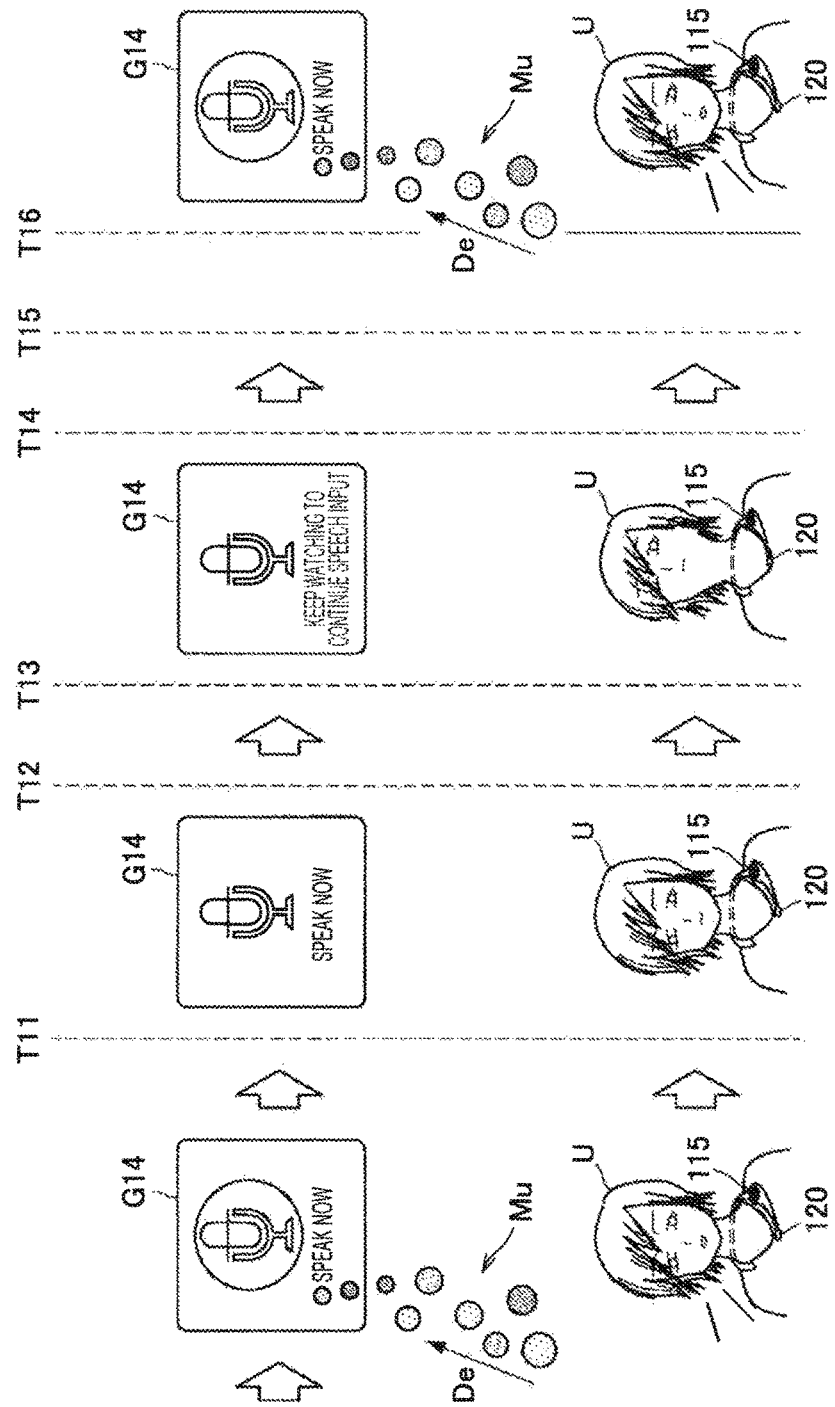
FIG. 24 is a diagram illustrated to describe a case where a silent state is started before completion of utterance of all the utterance contents that the user wants to be subjected to the speech recognition processing.

Moreover, in the examples illustrated in FIGS. 23 and 24, the user wears the operation input portion 115 including a sensor (e.g., an acceleration sensor) capable of detecting the tilt of the head. In addition, the user may wear the sound collection portion 120 as illustrated in FIGS. 23 and 24. A case where the silent state is started after completion of utterance of all the utterance contents that the user wants to be subjected to the speech recognition processing is described now with reference to FIG. 23.

When the activation trigger of the speech recognition processing is detected, the output control portion 146 activates the sound collection function of the sound collection portion 120. When the sound information acquisition portion 142 acquires the sound information collected by the sound collection portion 120, the output control portion 146 causes the display object Mu to be displayed as illustrated in FIG. 23. Then, the recognition control portion 144 causes the speech recognition portion 145 to start the speech recognition processing on the sound information acquired by the sound information acquisition portion 142.

Here, as illustrated in FIG. 23, in the case where the utterance of all the utterance contents that the user wants to be subjected to the speech recognition processing is completed (time T11) and the silent state remains unchanged, the recognition control portion 144 detects the silent section (time T12). Then, the output control portion 146 causes the output portion 130 to output an object (e.g., the speech recognition start operation object G14) indicating that the speech recognition processing can be continued on condition that the head is tilted in a predetermined direction (e.g., upward) upon detection of the silent section (time T13).

Subsequently, the recognition control portion 144 controls whether to continue the speech recognition processing on the basis of the tilt of the user's head. In this case, the utterance of all the utterance contents that the user wants to be subjected to the speech recognition processing is completed, so the user is not necessary to tilt the user's own head. If the user does not tilt the head, the tilt of the user's head falls below a predetermined reference value. Thus, if the tilt of the user's head falls below the reference value at predetermined timing, the recognition control portion 144 controls the speech recognition portion 145 so that the speech recognition portion 145 executes the predetermined execution operation based on the result of the speech recognition processing. The predetermined timing is not limited to particular timing as long as the silent section is detected.

Subsequently, the speech recognition portion 145 executes the execution operation based on the result of the speech recognition processing under the control of the recognition control portion 144 (time T16). In this case, the output control portion 146 may cause an object G22 for indicating that the speech input is suspended until the execution operation is completed to be output during the execution of the execution operation based on the result of the speech recognition processing. When the execution operation is completed, the output control portion 146 can cause the result of the execution operation to be output.

Next, a case where the silent state is started before completion of utterance of all the utterance contents that the user wants to be subjected to the speech recognition processing is described with reference to FIG. 24. When the sound information acquisition portion 142 acquires the sound information collected by the sound collection portion 120, the output control portion 146 causes the display object Mu to be displayed as illustrated in FIG. 24. Subsequently, the recognition control portion 144 causes the speech recognition portion 145 to start the speech recognition processing on the sound information acquired by the sound information acquisition portion 142.

Here, in the case where the silent state is started before completion of utterance of all the utterance contents that the user wants to be subjected to the speech recognition processing as illustrated in FIG. 24, the recognition control portion 144 detects the silent section (time T12). Then, the output control portion 146 causes the output portion 130 to output an object (e.g., the speech recognition start operation object G14) indicating that the speech recognition processing can be continued on condition that the head is tilted in a predetermined direction (e.g., upward) upon detection of the silent section (time T13).

Subsequently, the recognition control portion 144 controls whether to continue the speech recognition processing on the basis of the tilt of the user's head. In this case, not all the utterance contents that the user wants to be subjected to the speech recognition processing are completed, so the user is necessary to tilt the own head in a predetermined direction. If the user tilts the head, the tilt of the user's head exceeds the predetermined reference value. Thus, in the case where the tilt of the user's head exceeds the reference value at predetermined timing, the recognition control portion 144 may control the speech recognition portion 145 so that the speech recognition portion 145 continues the speech recognition processing. The predetermined timing is not limited to particular timing as long as the silent section is detected.

Subsequently, the speech recognition portion 145 continues the speech recognition processing on the sound information that is input from the sound collection portion 120 under the control of the recognition control portion 144 (time T16). This allows the temporarily stopped speech recognition processing is resumed. Moreover, when the sound information collected by the sound collection portion 120 starts to be acquired again by the sound information acquisition portion 142, the output control portion 146 may start displaying the display object Mu again as illustrated in FIG. 24. In the case where the tilt of the head is equal to a threshold, the recognition control portion 144 may control the speech recognition portion 145 so that the speech recognition portion 145 continues the speech recognition processing or executes the execution operation based on the result of the speech recognition processing.

In the above, as an example of controlling whether to continue the speech recognition processing on the basis of the user's gesture, the example of controlling whether to continue the speech recognition processing on the basis of the tilt of the user's head is described. Here, as another example, the recognition control portion 144 may control whether to continue the speech recognition processing on the basis of the motion of the user's head. Such an example is described with reference to FIGS. 25 and 26.

Figure 25:
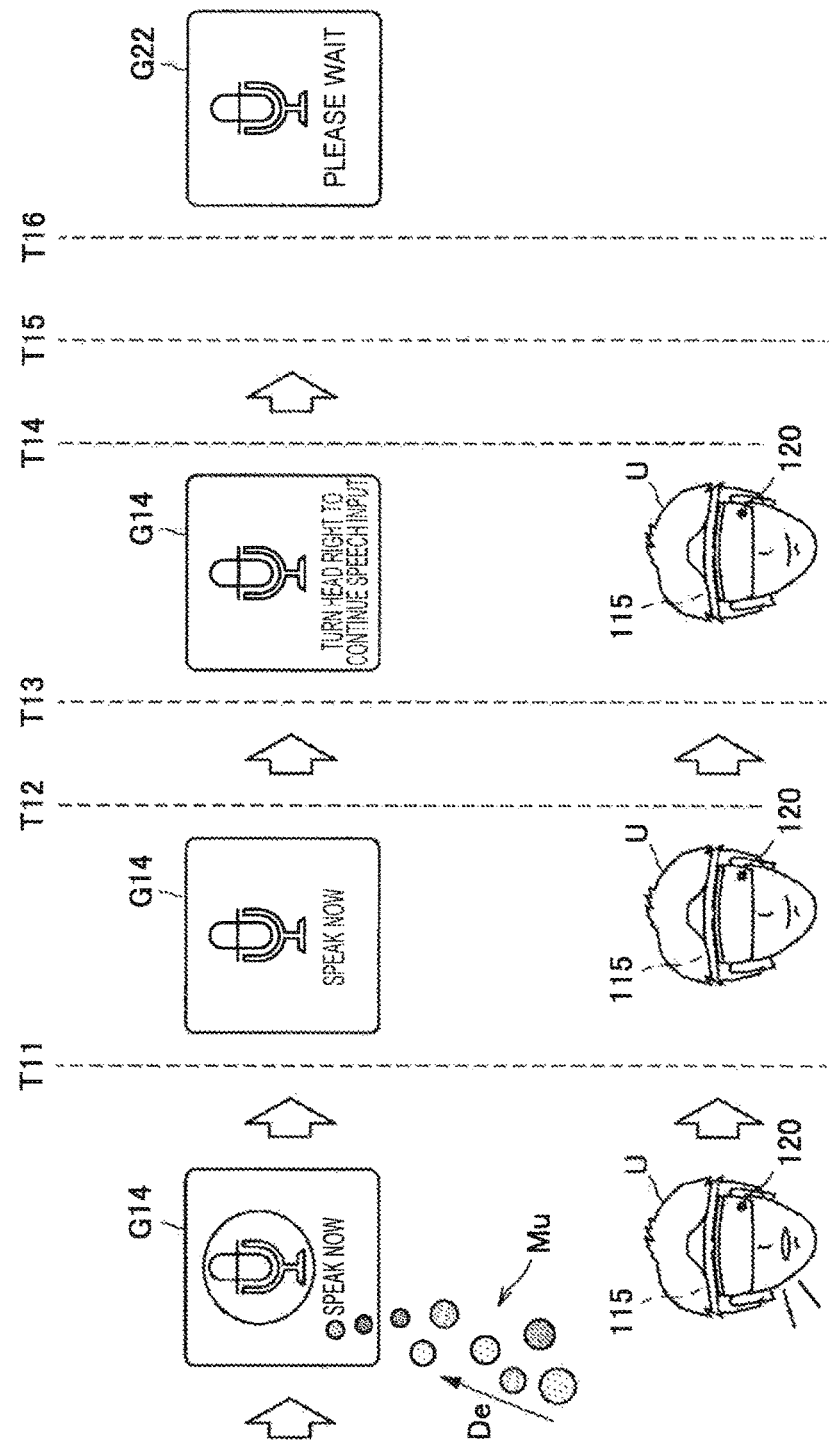
FIG. 25 is a diagram illustrated to describe a case where a silent state is started after completion of utterance of all the utterance contents that the user wants to be subjected to the speech recognition processing.
Figure 26:
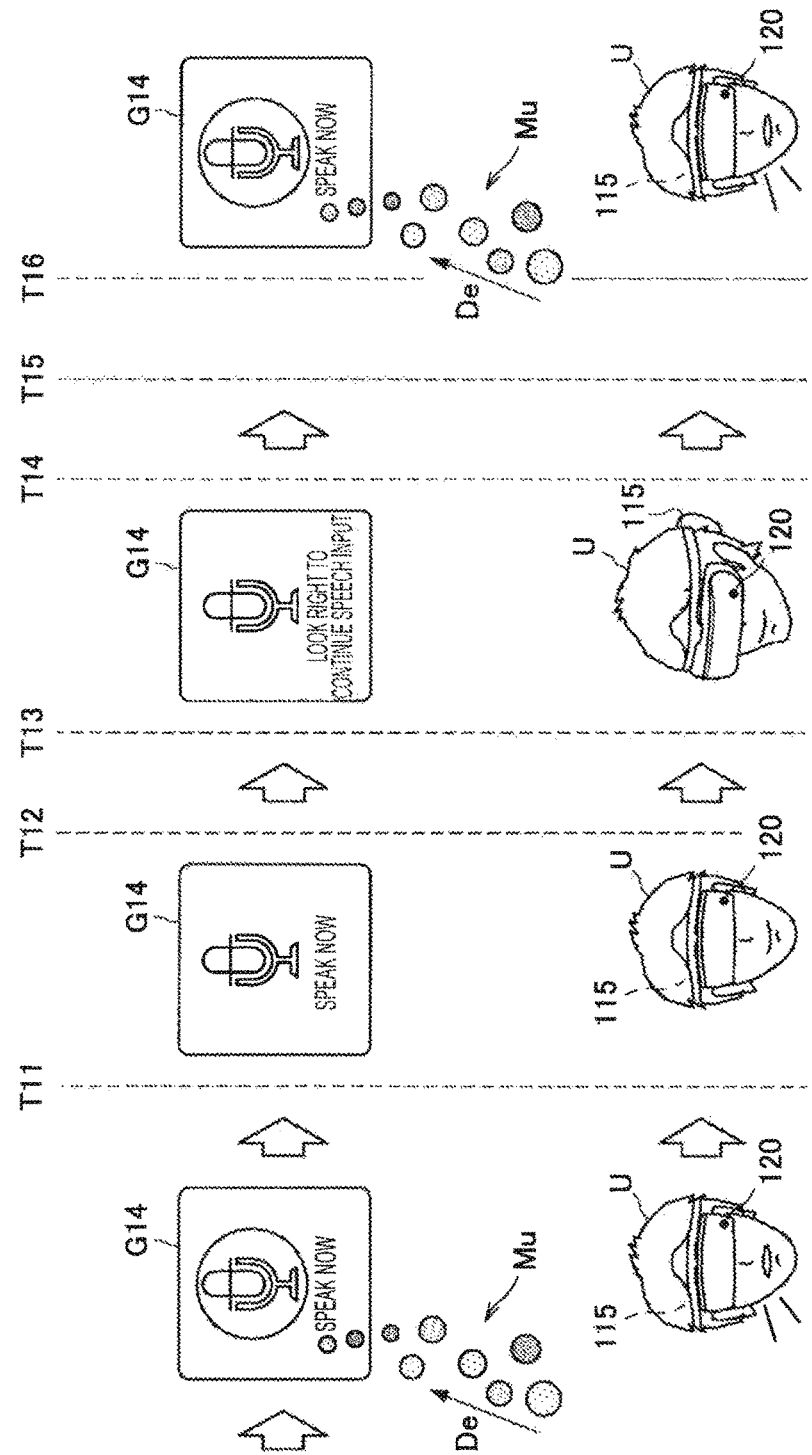
FIG. 26 is a diagram illustrated to describe a case where a silent state is started before completion of utterance of all the utterance contents that the user wants to be subjected to the speech recognition processing.

In the examples illustrated in FIGS. 25 and 26, the user wears an operation input portion 115 including a sensor (e.g., a gyro sensor) capable of detecting the motion of the head. In addition, the user may wear the sound collection portion 120 as illustrated in FIGS. 25 and 26. The case where the silent state is started after completion of utterance of all the utterance contents that the user wants to be subjected to the speech recognition processing is described now with reference to FIG. 25.

When the activation trigger of the speech recognition processing is detected, the output control portion 146 activates the sound collection function of the sound collection portion 120. When the sound information acquisition portion 142 acquires the sound information collected by the sound collection portion 120, the output control portion 146 causes the display object Mu to be displayed as illustrated in FIG. 25. Subsequently, the recognition control portion 144 causes the speech recognition portion 145 to start the speech recognition processing on the sound information acquired by the sound information acquisition portion 142.

Here, in the case where the silent state remains unchanged after completion of utterance of all the utterance contents that the user wants to be subjected to the speech recognition processing (time T11) as illustrated in FIG. 25, the recognition control portion 144 detects the silent section (time T12). Then, the output control portion 146 causes the output portion 130 to output an object (e.g., the speech recognition start operation object G14) indicating that the speech recognition processing can be continued on condition that the user turns the head in a predetermined direction (e.g., rightward) upon detection of the silent section (time T13).

Subsequently, the recognition control portion 144 controls whether to continue the speech recognition processing on the basis of the motion of the user's head. Here, the utterance of all the utterance contents that the user wants to be subjected to the speech recognition processing is completed, so the user is not necessary to turn the head in a predetermined direction. If the user does not turn the head to the right, the motion of the user's head does not indicates a predetermined movement (turning in a predetermined direction). Thus, in the case where the motion of the user's head does not indicate a predetermined motion at predetermined timing, the recognition control portion 144 may control the speech recognition portion 145 so that the speech recognition portion 145 executes a predetermined execution operation based on the result of the speech recognition processing. The predetermined timing is not limited to particular timing as long as the silent section is detected.

Subsequently, the speech recognition portion 145 executes the execution operation based on the result of the speech recognition processing under the control of the recognition control portion 144 (time T16). In this case, the output control portion 146 may cause the object G22 for indicating that the speech input is suspended until the execution operation is completed to be output during the execution of the execution operation based on the result of the speech recognition processing. When the execution operation is completed, the output control portion 146 can cause the result of the execution operation to be output.

Next, the case where the silent state is started before completion of utterance of all the utterance contents that the user wants to be subjected to the speech recognition processing is described with reference to FIG. 26. When the sound information acquisition portion 142 acquires the sound information collected by the sound collection portion 120, the output control portion 146 causes the display object Mu to be displayed as illustrated in FIG. 26. Subsequently, the recognition control portion 144 causes the speech recognition portion 145 to start the speech recognition processing on the sound information acquired by the sound information acquisition portion 142.

Here, in the case where the silent state remains unchanged before completion of utterance of all the utterance contents that the user wants to be subjected to the speech recognition processing as illustrated in FIG. 26, the recognition control portion 144 detects a silent section (time T12). Then, the output control portion 146 causes the output portion 130 to output an object (e.g., the speech recognition start operation object G14) indicating that the speech recognition processing can be continued on condition that the user turns the head in a predetermined direction (e.g., rightward) upon detection of the silent section (time T13).

Subsequently, the recognition control portion 144 controls whether to continue the speech recognition processing on the basis of the motion of the user's head. Here, not all the utterance contents that the user wants to be subjected to the speech recognition processing are completed, so the user is necessary to turn the own head in a predetermined direction. If the user turns the head in a predetermined direction, the motion of the user's head indicates a predetermined motion (turning in a predetermined direction). Thus, in the case where the motion of the user's head indicates a predetermined motion at predetermined timing, the recognition control portion 144 may control the speech recognition portion 145 so that the speech recognition portion 145 continues the speech recognition processing. The predetermined timing is not limited to particular timing as long as the silent section is detected.

Subsequently, the speech recognition portion 145 continues the speech recognition processing on the sound information that is input from the sound collection portion 120 under the control of the recognition control portion 144 (time T16). This allows the temporarily stopped speech recognition processing is resumed. Moreover, when the sound information collected by the sound collection portion 120 starts to be acquired again by the sound information acquisition portion 142, the output control portion 146 may start displaying the display object Mu again as illustrated in FIG. 26.

In the above, as an example of controlling whether to continue the speech recognition processing on the basis of the user's gesture, the example in which the recognition control portion 144 controls whether to continue the speech recognition processing on the basis of the motion of the user's head is described.

[1.7. Hardware Configuration Example]

Figure 27:
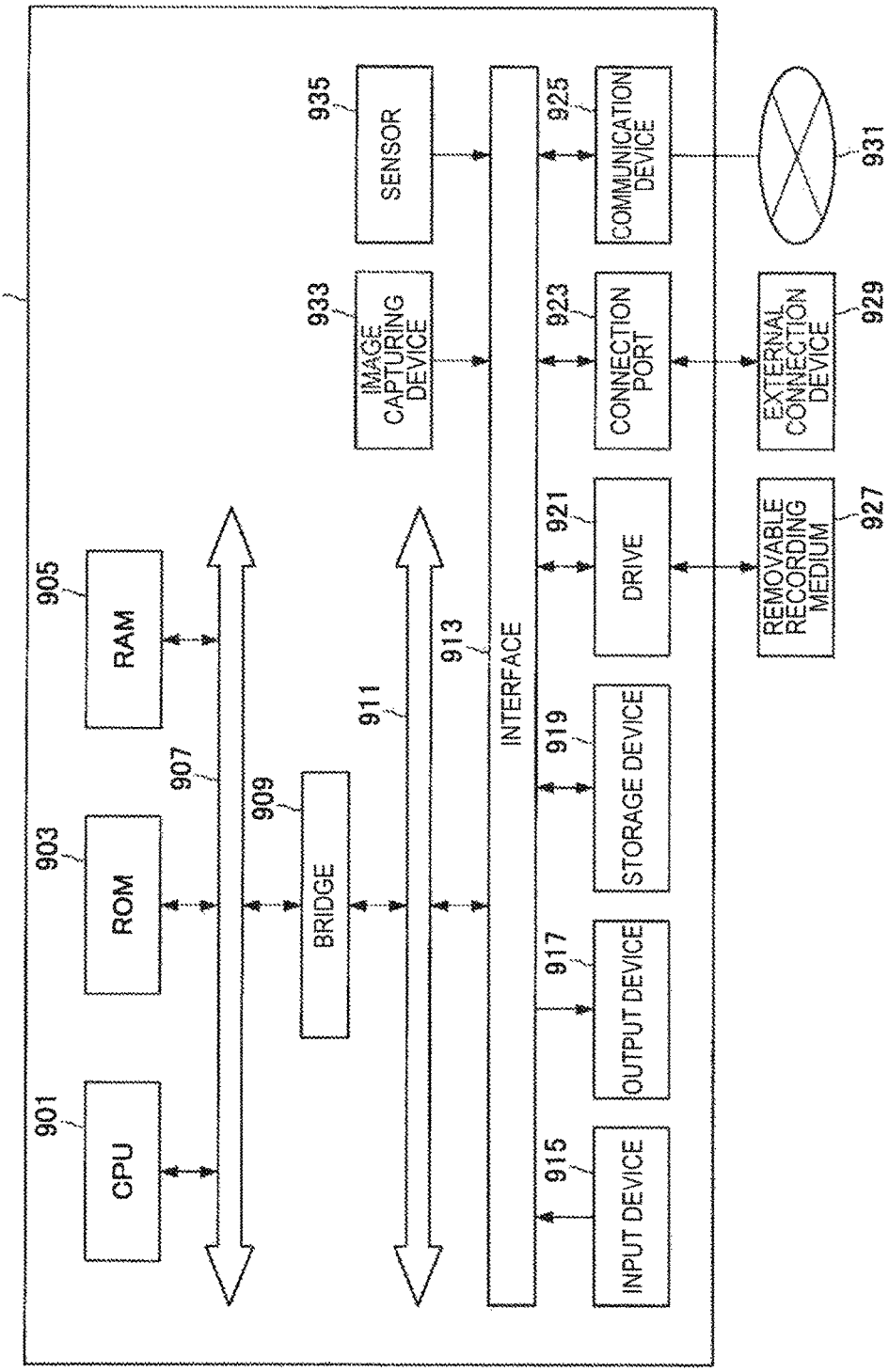
FIG. 27 is a block diagram illustrating a hardware configuration example of the information processing system.

Next, the hardware configuration of the information processing system 10 according to an embodiment of the present disclosure is described with reference to FIG. 27. FIG. 27 is a block diagram illustrating a hardware configuration example of the information processing system 10 according to an embodiment of the present disclosure.

As illustrated in FIG. 27, the information processing system 10 includes a central processing unit (CPU) 901, a read-only memory (ROM) 903, and a random-access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control unit, and controls the overall operation in the information processing system 10 or a part thereof in accordance with various programs recorded in the ROM 903, the RAM 905, the storage device 919, or a removable recording medium 927. The ROM 903 stores, for example, programs and operation parameters used by the CPU 901. The RAM 905 temporarily stores programs used in the execution by the CPU 901 and parameters that vary as appropriate in the execution. The CPU 901, the ROM 903, and the RAM 905 are connected with each other via the host bus 907 that is composed of an internal bus such as a CPU bus. Furthermore, the host bus 907 is connected to the external bus 911 such as peripheral component interconnect/interface (PCI) bus via the bridge 909.

The input device 915 is, for example, a device operated by a user, such as a mouse, a keyboard, a touch panel, a button, a switch, and a lever. The input device 915 may include a microphone for detecting user's speech. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the motion of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a speech or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drive (HDD), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded on the loaded removable recording medium 927 and outputs it to the RAM 905. In addition, the drive 921 writes in the loaded removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The connection of the external connection device 929 to the connection port 923 makes it possible to exchange various kinds of data between the information processing system 10 and the external connection device 929.

The communication device 925 is, for example, a communication interface composed of a communication device or the like, which is used to be connected to a communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 is a device that captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an acceleration sensor, a gyro sensor, a geomagnetic sensor, an optical sensor, and a sound sensor. The sensor 935 acquires information on the state of the information processing system 10 such as the attitude of the casing of the information processing system 10, and acquires information on the surrounding environment of the information processing system 10 such as brightness or noise around the information processing system 10. The sensor 935 may also include a GPS sensor that receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. This configuration can be changed appropriately depending on the technical level at the time of implementation.

2. CONCLUSION

According to the embodiment of the present disclosure as described above, there is provided the information processing system 10 including the recognition control portion 144 configured to control the speech recognition portion 145 so that the speech recognition portion 145 perform the speech recognition processing on the sound information that is input from the sound collection portion 120. The recognition control portion 144 controls whether to continue the speech recognition processing on the basis of the user's gesture detected at predetermined timing. This configuration makes it possible for the user to provide easily an instruction on whether to continue the speech recognition processing on the sound information.

Further, in a typical system as described above, when the silent section is detected from the sound information collected through the microphone and the speech recognition processing on the sound information is temporarily stopped, it may be difficult to continue the speech recognition processing again. On the other hand, according to the embodiment of the present disclosure, even if the silent section is detected from the sound information collected by the sound collection portion 120 and the speech recognition processing on the sound information is temporarily stopped, it is possible to easily continue the speech recognition processing again by the user's gesture.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the system configuration example of the information processing system 10 and the modified examples of the system configuration have been described above, but the system configuration example of the information processing system 10 is not limited to these examples. In one example, the output portion 130 may be a display provided in a wearable terminal (e.g., clock and glasses) in addition to the head-mounted display. In addition, in one example, the output portion 130 may be a display used in the healthcare field.

Further, as an example of controlling whether to continue the speech recognition processing on the basis of the user's gesture, the examples of controlling whether to continue the speech recognition processing on the basis of the user's line of sight, the tilt of the user's head, and the motion of the user's head of the user has been described above. However, the user's gesture is not limited to such example. In one example, the user's gesture may be a facial expression of the user, a motion of the lips of the user, a shape of the lips of the user, or an eye opening and closing state.

Furthermore, it is possible to create a program for causing the hardware such as CPU, ROM and RAM incorporated in the computer to execute functions equivalent to those of the information processing device 140 as described above. In addition, a computer-readable recording medium on which the program is recorded can also be provided.

Furthermore, the output control portion 146 generates the display control information for displaying the display content on the output portion 130 and outputs the generated display control information to the output portion 130, and thus the output control portion 147 can control the output portion 130 so that the output portion 130 displays the contents to be displayed. The contents of the display control information may be changed appropriately in accordance with the system configuration.

Specifically, the program used to implement the information processing device 140 may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10 described above is performed. In one specific example, the image input portion 110, the operation input portion 115, the sound collection portion 120, and the output portion 130 may be provided in a device different from a device provided with the information processing device 140, which are connected via a network. In this case, the information processing device 140 corresponds to, for example, a server such as a web server or a cloud server, and the image input portion 110, the operation input portion 115, the sound collection portion 120, and the output portion 130 may correspond to a client connected to the server via a network.

Further, all the components in the information processing device 140 are not necessarily included in the same device. In one example, some of the input image acquisition portion 141, the sound information acquisition portion 142, the operation detection portion 143, the recognition control portion 144, the speech recognition portion 145, and the output control portion 146 may be provided in a device different from the information processing device 140. In one example, the speech recognition portion 145 may be provided in a server different from the information processing device 140 that includes the input image acquisition portion 141, the sound information acquisition portion 142, the operation detection portion 143, the recognition control portion 144, and the output control portion 146.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a recognition control portion configured to control a speech recognition portion so that the speech recognition portion performs speech recognition processing on sound information input from a sound collection portion, in which the recognition control portion controls whether to continue the speech recognition processing on the basis of a gesture of a user detected at predetermined timing.

(2)

The information processing system according to (1), in which the recognition control portion controls whether to continue the speech recognition processing on the basis of a line of sight of the user.

(3)

The information processing system according to (2), in which the recognition control portion controls whether to continue the speech recognition processing on the basis of a viewpoint of the user and a motion object.

(4)

The information processing system according to (3), in which the recognition control portion controls whether to continue the speech recognition processing on the basis of a degree of coincidence between the viewpoint of the user and the motion object.

(5)

The information processing system according to (4), in which the recognition control portion controls the speech recognition portion so that the speech recognition portion continues the speech recognition processing in a case where the degree of coincidence exceeds a threshold.

(6)

The information processing system according to (5), in which the recognition control portion controls the speech recognition portion so that the speech recognition portion executes a predetermined execution operation based on a result of the speech recognition processing in a case where the degree of coincidence falls below the threshold.

(7)

The information processing system according to any one of (4) to (6), further including:

an output control portion configured to cause an output portion to output the motion object.

(8)

The information processing system according to (7), in which the output control portion causes the output portion to output the motion object in a case where duration in which a volume of the sound information continuously falls below a reference volume reaches predetermined target time after the speech recognition process is started.

(9)

The information processing system according to (7) or (8), in which the predetermined timing is timing after the output portion outputs the motion object.

(10)

The information processing system according to any one of (7) to (9), in which the output control portion causes the output portion to output a predetermined first notification object in a case where the degree of coincidence exceeds a threshold.

(11)

The information processing system according to (10), in which the output control portion causes the output portion to output a predetermined second notification object different from the first notification object in a case where the degree of coincidence falls below the threshold.

(12)

The information processing system according to (1), in which the recognition control portion controls whether to continue the speech recognition processing on the basis of a tilt of a head of the user.

(13)

The information processing system according to (12), in which the recognition control portion controls the speech recognition portion so that the speech recognition portion continues the speech recognition processing in a case where the tilt of the head of the user exceeds a predetermined reference value.

(14)

The information processing system according to (13), in which the recognition control portion controls the speech recognition portion so that the speech recognition portion executes a predetermined execution operation based on a result of the speech recognition processing in a case where the tilt of the head of the user falls below the reference value.

(15)

The information processing system according to (1), in which the recognition control portion controls whether to continue the speech recognition processing on the basis of motion of a head of the user.

(16)

The information processing system according to (15), in which the recognition control portion controls the speech recognition portion so that the speech recognition portion continues the speech recognition processing in a case where the motion of the head of the user indicates predetermined motion.

(17)

The information processing system according to (16), in which the recognition control portion controls the speech recognition portion so that the speech recognition portion executes a predetermined execution operation based on a result of the speech recognition processing in a case where the motion of the head of the user fails to indicate the predetermined motion.

(18)

The information processing system according to any one of (1) to (17), in which the recognition control portion causes the speech recognition portion to start the speech recognition processing in a case where an activation trigger of the speech recognition processing is detected.

(19)

The information processing system according to (6), in which the execution operation includes at least one of an operation of outputting a search result corresponding to a result of the speech recognition processing, an operation of outputting the result of the speech recognition processing, an operation of outputting a processing result candidate obtained during the speech recognition processing, and an operation of outputting a string used to reply to utterance contents extracted from the result of the speech recognition processing.

(20)

An information processing method including:

controlling a speech recognition portion so that the speech recognition portion performs speech recognition processing on sound information input from a sound collection portion, in which the controlling includes controlling, by a processor, whether to continue the speech recognition processing on the basis of a gesture of a user detected at predetermined timing.

REFERENCE SIGNS LIST 10 information processing system
110 image input portion
115 operation input portion
120 sound collection portion
130 output portion
140 information processing device (controller)
141 input image acquisition portion
142 sound information acquisition portion
143 operation detection portion
144 recognition control portion
145 speech recognition portion
146 output control portion
G10 initial screen
G11 recognition string display field
G12 delete-all operation object
G13 decision operation object
G14 speech recognition start operation object (motion object)
G15 backward movement operation object
G16 forward movement operation object
G17 deletion operation object
K10 trajectory of motion object
K20, K21 trajectory of point of view of user
G41 first notification object
G42 second notification object
r degree of coincidence

The invention claimed is:

1. An information processing system comprising:
a recognition control portion configured to
control a speech recognition portion so that the speech recognition portion performs speech recognition processing on sound information input from a sound collection portion, and
detect a duration, in which a volume of the sound information continuously falls below a reference volume, reaching a predetermined target time after the speech recognition processing has started; and
an output control portion configured to cause an output portion to output a motion object that is displayed by a display after the detected duration, wherein the recognition control portion controls whether to continue the speech recognition processing, based on a degree of coincidence between a trajectory of a viewpoint of a user detected after the output portion outputs the motion object and a trajectory of the motion object displayed by the display, wherein the recognition control portion and the output control portion are each implemented via at least one processor.

2. The information processing system according to claim 1, wherein the recognition control portion controls the speech recognition portion so that the speech recognition portion continues the speech recognition processing in a case where the degree of coincidence exceeds a threshold.

3. The information processing system according to claim 2, wherein the recognition control portion controls the speech recognition portion so that the speech recognition portion executes a predetermined execution operation based on a result of the speech recognition processing in a case where the degree of coincidence falls below the threshold.

4. The information processing system according to claim 3, wherein the predetermined execution operation includes at least one of an operation of outputting a search result corresponding to a result of the speech recognition processing, an operation of outputting the result of the speech recognition processing, an operation of outputting a processing result candidate obtained during the speech recognition processing, and an operation of outputting a string used to reply to utterance contents extracted from the result of the speech recognition processing.

5. The information processing system according to claim 1, wherein the output control portion causes the output portion to output a predetermined first notification object in a case where the degree of coincidence exceeds a threshold.

6. The information processing system according to claim 5, wherein the output control portion causes the output portion to output a predetermined second notification object different from the predetermined first notification object in a case where the degree of coincidence falls below the threshold.

7. The information processing system according to claim 1, wherein the recognition control portion controls whether to continue the speech recognition processing, based on a tilt of a head of the user.

8. The information processing system according to claim 7, wherein the recognition control portion controls the speech recognition portion so that the speech recognition portion continues the speech recognition processing in a case where the tilt of the head of the user exceeds a predetermined reference value.

9. The information processing system according to claim 8, wherein the recognition control portion controls the speech recognition portion so that the speech recognition portion executes a predetermined execution operation based on a result of the speech recognition processing in a case where the tilt of the head of the user falls below the predetermined reference value.

10. The information processing system according to claim 1, wherein the recognition control portion controls whether to continue the speech recognition processing, based on motion of a head of the user.

11. The information processing system according to claim 10, wherein the recognition control portion controls the speech recognition portion so that the speech recognition portion continues the speech recognition processing in a case where the motion of the head of the user indicates a predetermined motion.

12. The information processing system according to claim 11, wherein the recognition control portion controls the speech recognition portion so that the speech recognition portion executes a predetermined execution operation based on a result of the speech recognition processing in a case where the motion of the head of the user fails to indicate the predetermined motion.

13. The information processing system according to claim 1, wherein the recognition control portion causes the speech recognition portion to start the speech recognition processing in a case where an activation trigger of the speech recognition processing is detected.

14. An information processing method comprising:

performing speech recognition processing on sound information input from a sound collection portion;

detecting a duration, in which a volume of the sound information continuously falls below a reference volume, reaching a predetermined target time after the speech recognition processing has started;

outputting a motion object that is displayed by a display after the detected duration; and controlling, by a processor, whether to continue the speech recognition processing, based on a degree of coincidence between a trajectory of a viewpoint of a user detected after the outputting of the motion object and a trajectory of the motion object displayed by the display.

15. A non-transitory computer-readable medium having embodied thereon a program, which when executed by a computer causes the computer to execute a method, the method comprising:

performing speech recognition processing on sound information input from a sound collection portion;

detecting a duration, in which a volume of the sound information continuously falls below a reference volume, reaching a predetermined target time after the speech recognition processing has started;

outputting a motion object that is displayed by a display after the detected duration; and controlling, by a processor, whether to continue the speech recognition processing, based on a degree of coincidence between a trajectory of a viewpoint of a user detected after the outputting of the motion object and a trajectory of the motion object displayed by the display.

* * * * *